US008024532B2

(12) United States Patent
Taguchi et al.

(10) Patent No.: US 8,024,532 B2
(45) Date of Patent: *Sep. 20, 2011

(54) DATA MANAGEMENT METHOD FOR ERASING DATA IN COMPUTER SYSTEM

(75) Inventors: Yuichi Taguchi, Sagamihara (JP); Masayuki Yamamoto, Sagamihara (JP); Hiroshi Nasu, Yokohama (JP); Noriko Nakajima, Machida (JP)

(73) Assignee: Hitachi, Ltd., Tokyo (JP)

( * ) Notice: Subject to any disclaimer, the term of this patent is extended or adjusted under 35 U.S.C. 154(b) by 735 days.

This patent is subject to a terminal disclaimer.

(21) Appl. No.: 12/062,705

(22) Filed: Apr. 4, 2008

(65) Prior Publication Data

US 2009/0182930 A1    Jul. 16, 2009

(30) Foreign Application Priority Data

Jan. 16, 2008 (JP) ................................. 2008-006741

(51) Int. Cl.
*G06F 13/00* (2006.01)
(52) U.S. Cl. ....................................... 711/154; 711/159
(58) Field of Classification Search .................. 711/154, 711/159
See application file for complete search history.

(56) References Cited

U.S. PATENT DOCUMENTS 7,831,551 B2 * 11/2010 Nasu et al. .................... 707/610
2009/0063797 A1 * 3/2009 Taguchi et al. ............... 711/162

FOREIGN PATENT DOCUMENTS

JP          2005-11277          1/2005

* cited by examiner

*Primary Examiner* — Reba I. Elmore
(74) *Attorney, Agent, or Firm* — Brundidge & Stanger, P.C.

(57) ABSTRACT

There is provided a computer system comprising a first storage system and a second storage system coupled to the first storage system. The first storage system provides a first storage area. The second storage system provides a second storage area. The second storage system reads and writes the requested data from and to the first storage area associated with the second storage area; specifies the first storage area associated with the second storage area from which the data is to be erased upon reception of a request for erasing the data stored in the second storage area; and transmits the request for erasing the data to the first storage system providing the specified first storage area. The first storage system erases the data stored in the specified first storage area, based on a data erasure condition included in the request for erasing the data.

20 Claims, 24 Drawing Sheets

| RAID GROUP IDENTIFICATION INFORMATION | MAGNETIC STORAGE DEVICE IDENTIFICATION INFORMATION | | | |
|---|---|---|---|---|
| | #1 | #2 | #3 | #4 |
| RG-01 | HD-01 | HD-02 | HD-03 | HD-04 |
| RG-11 | HD-11 | HD-12 | HD-13 | HD-14 |
| ... | ... | ... | ... | ... |

*FIG. 10*

| STORAGE AREA IDENTIFICATION INFORMATION | RAID GROUP IDENTIFICATION INFORMATION | START BLOCK ADDRESS | END BLOCK ADDRESS |
|---|---|---|---|
| LD-01 | RG-01 | 0x0001 | 0x0100 |
| LD-02 | RG-02 | 0x0101 | 0x0200 |
| LD-03 | RG-02 | 0x0201 | 0x0300 |
| LD-04 | RG-03 | 0x0101 | 0x0500 |
| ... | ... | ... | ... |

*FIG. 11*

| COMMUNICATION INTERFACE IDENTIFICATION INFORMATION | STORAGE UNIT IDENTIFICATION INFORMATION | STORAGE AREA IDENTIFICATION INFORMATION |
|---|---|---|
| 50:00:01:1E:0A:E8:12 | LU-21 | LD-01 |
| 50:00:01:1E:0A:E8:12 | LU-22 | LD-03 |
| 50:00:01:1E:0A:E8:13 | LU-31 | LD-04 |
| 50:00:01:1E:0A:E8:13 | LU-32 | LD-11 |
| 50:00:01:1E:0A:E8:13 | LU-33 | LD-12 |
| ... | ... | ... |

FIG. 12

| CACHE MEMORY ADDRESS | STORAGE AREA IDENTIFICATION INFORMATION | STORAGE AREA ADDRESS |
|---|---|---|
| 0x0000 | LD-11 | 0x00A0 |
| 0x0004 | LD-91 | 0x0000 |
| 0x0008 | LD-01 | 0x0E02 |
| 0x0012 | LD-91 | 0x0004 |
| ... | ... | ... |

| COMMUNICATION INTERFACE IDENTIFICATION INFORMATION (20141) | STORAGE UNIT IDENTIFICATION INFORMATION (20142) | STORAGE AREA IDENTIFICATION INFORMATION (20143) |
| --- | --- | --- |
| 50:00:01:1E:0A:E8:02 | LU-11 | LD-01 |
| ... | ... | ... |

| VIRTUAL STORAGE AREA IDENTIFICATION INFORMATION (20151) | COMMUNICATION INTERFACE IDENTIFICATION INFORMATION (20152) | STORAGE UNIT IDENTIFICATION INFORMATION (20153) |
| --- | --- | --- |
| LD-01 | 50:00:01:1E:0A:E8:12 | LU-21 |
| LD-92 | 50:00:01:1E:0A:E8:12 | LU-22 |
| ... | ... | ... |

| HOST COMPUTER STORAGE AREA IDENTIFICATION INFORMATION (30121) | COMMUNICATION INTERFACE IDENTIFICATION INFORMATION (30122) | STORAGE UNIT IDENTIFICATION INFORMATION (30123) |
| --- | --- | --- |
| /mount/home | 50:00:01:1E:0A:E8:02 | LU-11 |
| /mount/oradb01 | 50:00:01:1E:0A:E8:03 | LU-12 |
| ... | ... | ... |

(3012)

| 30161 | 30162 | 30163 |
|---|---|---|
| FILE NAME | RECORDING TIME | CACHE FILE NAME |
| /mount/home/user01/a.txt | 2000/01/01 00:01 | /tmp/a.txt |
| /mount/home/user01/b.doc | 2000/01/01 01:00 | /tmp/b.doc |
| ... | ... | ... |

| 50141 | 50142 | 50143 |
|---|---|---|
| MANAGEMENT COMMUNICATION INTERFACE IDENTIFICATION INFORMATION | DATA I/O COMMUNICATION INTERFACE IDENTIFICATION INFORMATION | ERASURE PROGRAM MOUNT STATUS INFORMATION |
| 192.168.0.1 | n/a | 1 |
| 192.168.0.2 | n/a | 0 |
| 192.168.0.3 | 50:00:01:1E:0A:E8:02 | 1 |
|  | 50:00:01:1E:0A:E8:03 |  |
| 192.168.0.4 | 50:00:01:1E:0A:E8:10 | 0 |
| ... | ... | ... |

DATA MANAGEMENT METHOD FOR ERASING DATA IN COMPUTER SYSTEM

CLAIM OF PRIORITY

The present application claims priority from Japanese patent application P 2008-006741 filed on Jan. 16, 2008, the content of which is hereby incorporated by reference into this application.

BACKGROUND

This invention relates to a technology of erasing data stored in a storage system, in particular, to a technology of preventing a load for data erasure from being increased.

A storage area network (SAN) for coupling at least one external storage system and at least one computer is known. The SAN is particularly effective when a plurality of computers share a single large-scale storage system. A storage system including the SAN is excellent in scalability because such a storage system allows a storage system or a computer to be easily added or deleted.

As the external storage system coupled to the SAN, a disk array apparatus is frequently used in general. The disk array apparatus includes a large number of storage devices as represented by a hard disk (for example, magnetic storage devices) mounted therein.

The disk array apparatus manages a plurality of magnetic storage devices as a single redundant array of independent disks (RAID) group by a RAID technology. The RAID group forms at least one logical storage area. The computer coupled to the SAN executes data input/output processing for the logical storage area. When recording data on the storage area, the disk array apparatus records redundant data on the magnetic storage devices constituting the RAID group. Even if one of the magnetic storage devices is broken, the redundant data enables the recovery of the data.

In operation of the SAN, multiple types of storage systems different in categories or fabricated by different fabricators are sometimes present at the same time. In such a situation, the management such as capacity allocation and volume assignment should be carried out, taking account of the characteristics of each device. Therefore, a burden on an operation administrator is increased. In order to cope with such a problem, a virtual storage technology can be used. A storage virtualization device (virtual storage system) virtualizes a storage device mounted in another storage system as if the storage device were a resource stored on the storage virtualization device to provide the virtualized storage device for a host computer (see JP 2005-011277 A). Moreover, the virtual storage technology allows resources on different types of storage systems having different characteristics to be managed in an integrated fashion, thereby reducing the burden on the administrator.

Further, in order to erase the data recorded on the magnetic storage device, dummy data is written over the storage area from which the data is to be erased. However, if the dummy data is overwritten only once, there still exists remanent magnetism to allow the data to be recovered in some cases. In order to solve such a problem, processing of repeating the overwriting of dummy data for a plurality of times to completely eliminate the remanent magnetism is recommended. By completely eliminating the remanent magnetism to prevent the data from being recovered, a security risk can be lowered.

SUMMARY

A magnetic disk medium (hard disk drive) is widely used to store data. The data recorded on the magnetic disk medium has characteristics in that the data is not completely deleted by a simple file deletion operation or volume formatting process and can be still recovered even after such a process. In particular, when data is overwritten only once or the formatting process is simply performed, the remanent magnetism still exists on the medium according to the characteristics of the magnetic disk. As a result, the data is undesirably recovered based on the remanent magnetism in some cases.

Moreover, with the recent increasing concern about security, a technology of completely erasing the stored data is demanded. Therefore, complete erasure processing of repeating the overwriting of the dummy data for a plurality of times is effective in completely eliminating the remanent magnetism on the magnetic disk.

On the other hand, in the storage system including the computer and the storage system coupled via the network, when overwrite processing is performed on the entire storage area (storage volume) for erasing the storage area on the computer, a large amount of data to be written is transferred to the network to increase a load. Similarly, in the virtualized storage system, when the erasure processing is performed on the virtual storage area, a large amount of data to be transferred is generated between the storage virtualization device (virtual storage system) and the storage system.

A representative aspect of this invention is as follows. That is, there is provided a computer system comprising a first storage system and a second storage system coupled to the first storage system. The first storage system comprises a first interface coupled to the second storage system, a first processor coupled to the first interface, and a first memory coupled to the first processor, the first storage system providing a first storage area from and to which data is read and written. The second storage system comprises a second interface coupled to the first storage system, a second processor coupled to the second interface, and a second memory coupled to the second processor, the second storage system providing a second storage area. The second storage system reads and writes the requested data from and to the first storage area associated with the second storage area when the data is requested to be read from and to be written to the second storage area; specifies the first storage area associated with the second storage area from which the data is to be erased upon reception of a request for erasing the data stored in the second storage area; and transmits the request for erasing the data to the first storage system providing the specified first storage area. The first storage system erases the data stored in the specified first storage area, based on a data erasure condition included in the request for erasing the data, upon reception of the request for erasing the data.

According to an aspect of this invention, when the data stored in the second storage area corresponding to the virtual storage area is to be erased, the data erasure request is transmitted to the storage system which provides the first storage area for actually storing the data to prevent a system load from increasing. For example, a large amount of overwrite data corresponding to the entire virtual storage area can be prevented from being transferred to the network.

BRIEF DESCRIPTION OF THE DRAWINGS

The present invention can be appreciated by the description which follows in conjunction with the following figures, wherein:

FIG. 10 is an explanatory diagram showing an example of RAID group configuration information stored in the storage system in accordance with the first embodiment of this invention;

FIG. 11 is a view showing an example of storage area configuration information stored in the storage system in accordance with the first embodiment of this invention;

FIG. 12 is an explanatory diagram showing an example of logical storage unit configuration information stored in the storage system in accordance with the first embodiment of this invention;

FIG. 13 is an explanatory diagram showing an example of cache data recording information stored in the storage system in accordance with the first embodiment of this invention;

FIG. 14A is an explanatory diagram showing an example of logical storage unit configuration information stored in the virtual storage system in accordance with the first embodiment of this invention;

FIG. 14B is an explanatory diagram showing an example of virtual storage area configuration information stored in the virtual storage system in accordance with the first embodiment of this invention;

FIG. 15 is an explanatory diagram showing an example of host computer storage area configuration information stored in the host computer in accordance with the first embodiment of this invention;

FIG. 16 is an explanatory diagram showing an example of cache data recording information stored in the host computer in accordance with the first embodiment of this invention;

FIG. 17 is an explanatory diagram showing an example of data erasure program mount status information stored in the management computer in accordance with the first embodiment of this invention;

DETAILED DESCRIPTION OF THE PREFERRED EMBODIMENTS

Hereinafter, embodiments of this invention will be described referring to the accompanying drawings.

First Embodiment

Figure 1:
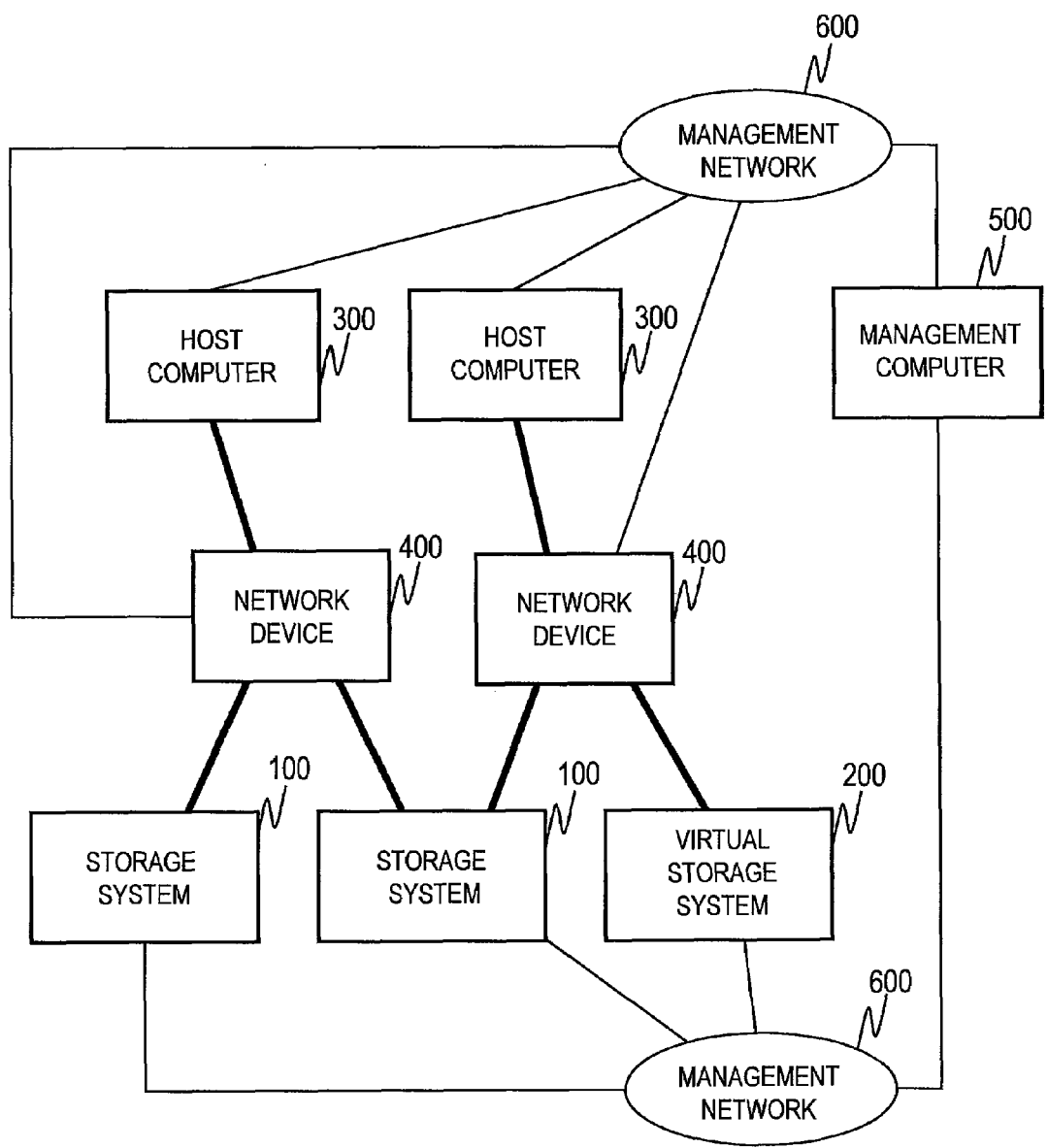
FIG. 1 is a block diagram showing a configuration of a storage area network in accordance with a first embodiment of this invention.

FIG. 1 is a block diagram showing a configuration of a storage area network (SAN) according to a first embodiment of this invention.

The SAN is configured by data input/output (hereinafter, referred to as I/O) networks and management networks 600.

The data I/O network includes storage systems 100, a virtual storage system 200, host computers 300, and network coupling systems 400. The host computer 300 and the storage system 100 are coupled to each other through the network device 400 to input/output data to/from each other. The data I/O network is indicated by a thick line in FIG. 1. The data I/O network is a network using the related art such as the Fibre Channel or the Ethernet ("Ethernet" is the registered trademark; the same is applied to the description below).

The management network 600 is also a network using the related art such as the Fibre Channel or the Ethernet. The storage system 100, the virtual storage system 200, the host computers 300, and the network coupling system 400 are coupled to a management computer 500 through the management networks 600.

On the host computer 300, a database or an application such as a file server operates to execute I/O of data for a storage area. The storage system 100 includes a storage device such as a magnetic storage device and provides the storage area for the data which is read or written by the host computer 300.

The virtual storage system 200 associates the storage area provided by the storage system 100 with the virtual storage system 200 itself and provides the storage area for the host computer 300 as if the storage area were provided by the virtual storage system 200. As in the case of the storage system 100, the virtual storage system 200 couples the data I/O network and the management network to enable data I/O to/from another device.

The network device 400 couples the host computer 300 and the storage system 100 to each other, and is, for example, a fibre channel switch.

Each of the management network 600 and each of the data I/O network are configured as an independent network in the first embodiment of this invention, but a single network having the functions of the two networks may be used instead.

Figure 2:
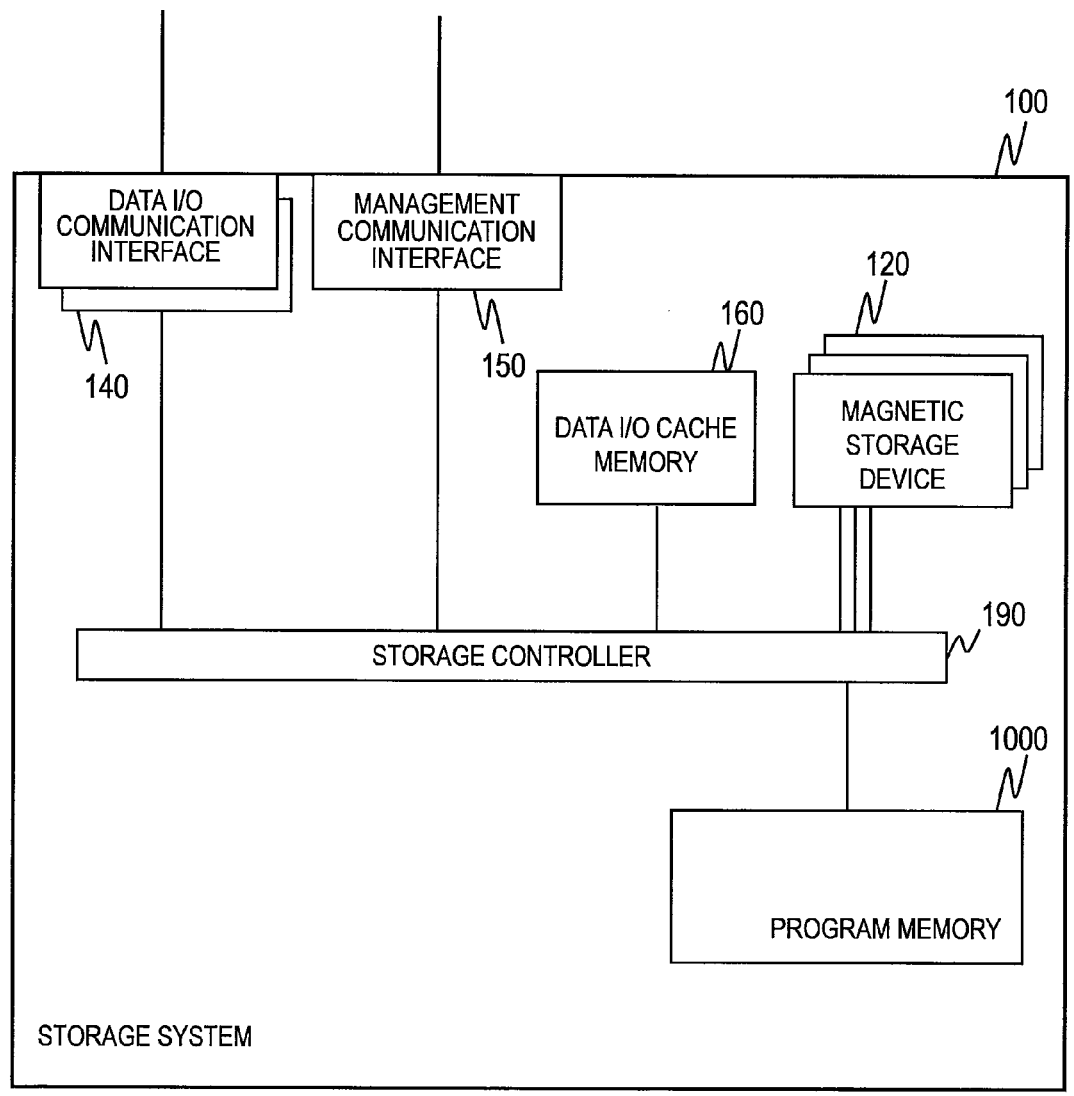
FIG. 2 is a block diagram showing a configuration of a storage system in accordance with the first embodiment of this invention.

FIG. 2 is a block diagram showing the storage system 100 according to the first embodiment of this invention.

The storage system 100 includes a data I/O communication interface 140, a management communication interface 150, a storage controller 190, a program memory 1000, a data I/O cache memory 160, and a magnetic storage device 120. The data I/O communication interface 140, the management communication interface 150, the program memory 1000, the data I/O cache memory 160, and the magnetic storage device 120 are coupled to each other through the storage controller 190.

The data I/O communication interface 140 is coupled to the network device 400 via the data I/O network. The management communication interface 150 is coupled to the management computer 500 via the management network 600. The number of the data I/O communication interfaces 140 and that of the management communication interfaces 150 are arbitrary. The data I/O communication interface 140 is not required to be configured independently of the management communication interface 150. Management information may be input/output through the data I/O communication interface 140 to allow the data I/O communication interface 140 to also serve as the management communication interface 150.

The storage controller 190 includes a processor for controlling the storage system 100. The data I/O cache memory 160 is a temporary storage area for increasing the speed of I/O from the host computer 300 to the storage area. The data I/O cache memory 160 is generally configured by a volatile memory, but the data I/O cache memory 160 can also be configured by a non-volatile memory or a magnetic storage device. The number and the capacity of the data I/O cache memories 160 are not limited. The magnetic storage device 120 stores data to be read/written by the host computer 300.

The program memory 1000 stores programs and control information necessary for processing executed in the storage system 100. The program memory 1000 is configured by a magnetic storage device or a volatile semiconductor memory. The control programs and the control information stored in the program memory 1000 will be described below referring to FIG. 6.

Figure 3:
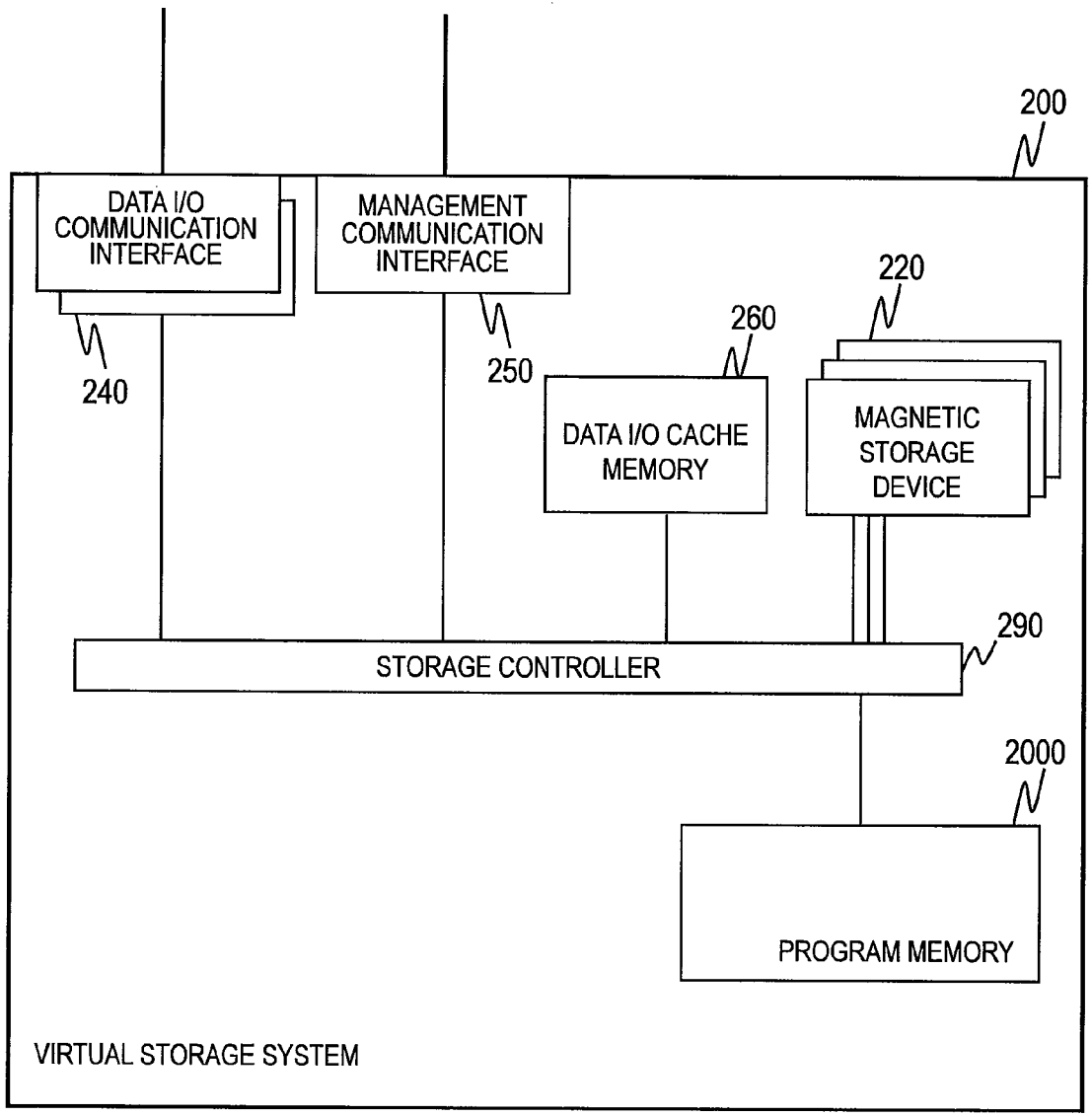
FIG. 3 is a block diagram showing a configuration of a virtual storage system in accordance with a first embodiment of this invention.

FIG. 3 is a block diagram showing a configuration of the virtual storage system 200 according to the first embodiment of this invention.

The virtual storage system 200 has the same hardware configuration as that of the storage system 100. In the first embodiment of this invention, even the virtual storage system 200 includes a magnetic storage device 220 to have a mechanism of providing a storage area. As a result, the virtual storage system 200 can also play the role of the storage system 100. The virtual storage system 200 is not necessarily required to include the magnetic storage device 220 if only the role of providing a virtual storage area is required to be provided.

Control programs and control information stored in a program memory 2000 are described below referring to FIG. 7.

Figure 4:
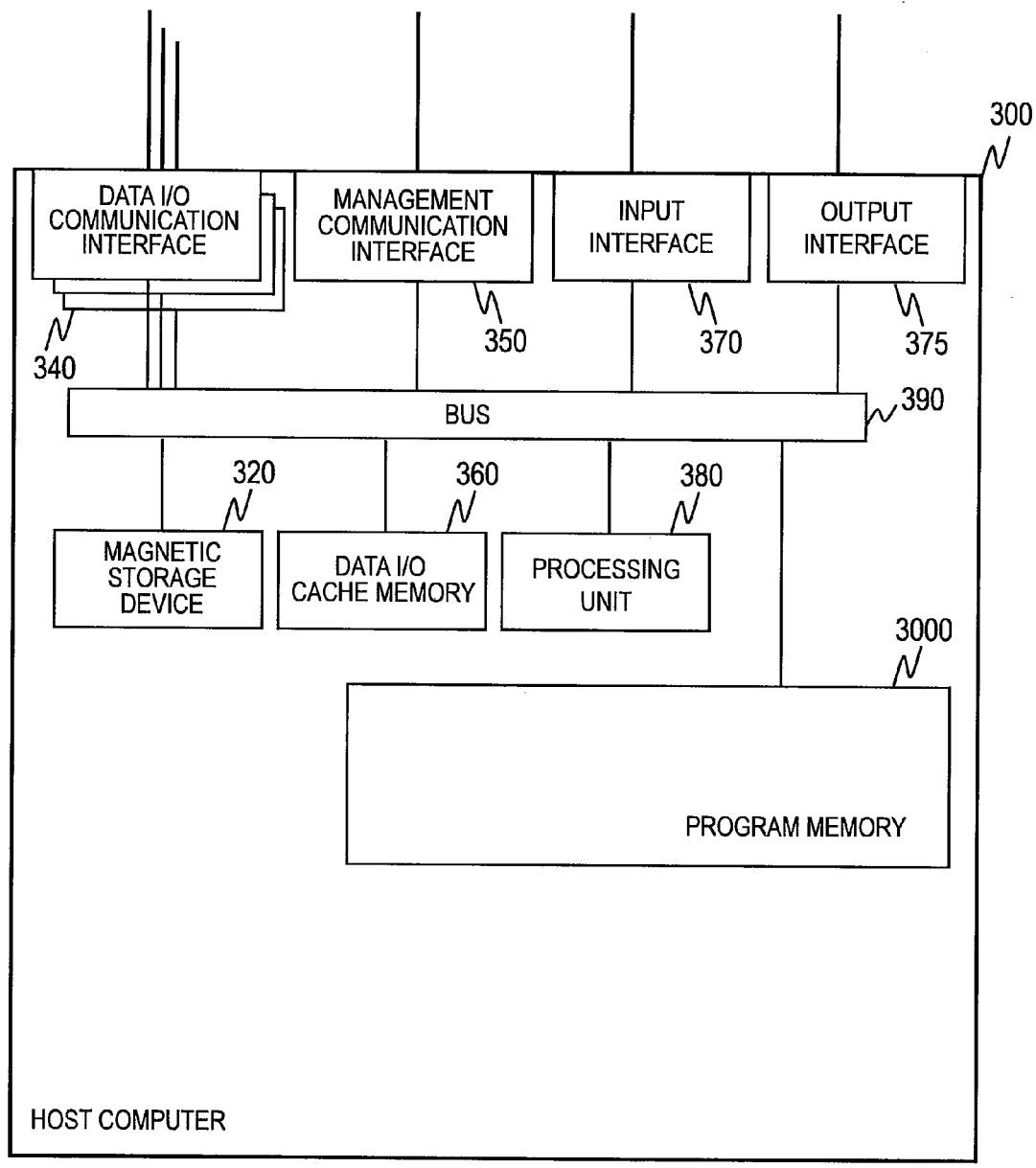
FIG. 4 is a block diagram showing a configuration of a host computer in accordance with the first embodiment of this invention.

FIG. 4 is a block diagram showing a configuration of the host computer 300 according to the first embodiment of this invention.

The host computer 300 includes a data I/O communication interface 340, a management communication interface 350, an input interface 370, an output interface 375, a processing unit 380, a magnetic storage device 320, and a data I/O cache memory 360.

The data I/O communication interface 340, the management communication interface 350, the input interface 370, the output interface 375, the processing unit 380, the magnetic storage device 320, and the data I/O cache memory 360 are coupled to each other through a communication bus 390. The host computer 300 has a hardware configuration realizable by a general-purpose computer (PC).

The data I/O communication interface 340 couples to the network device 400 via the data I/O network to input/output the data. The management communication interface 150 couples to the management computer 500 via the management network 600 to input/output the management data. The number of the data I/O communication interfaces 340 and that of the management communication interfaces 350 are arbitrary. The data I/O communication interface 340 is not required to be configured independently of the management communication interface 350. The management information may be input/output through the data I/O communication interface 340 to allow the data I/O communication interface 340 to also serve as the management communication interface 350.

The input interface 370 is coupled to a device to which a user inputs information, for example, to a keyboard and a mouse. The output interface 375 is coupled to a device for outputting information to the user, for example, to a general-purpose display. The processing unit 380 executes various arithmetic operations and corresponds to a CPU or a processor. The magnetic storage device 320 stores an operating system and software such as an application.

The data I/O cache memory 360 is configured by a volatile memory or the like and is used to increase the speed of data I/O to/from the magnetic storage device 320. The data I/O cache memory 360 is generally configured by the volatile memory, but the data I/O cache memory 360 may be configured by the non-volatile memory or the magnetic storage device. The number and the capacity of the data I/O cache memories 360 are not limited.

The program memory 3000 stores programs and control information necessary for processing executed in the host computer 300. The program memory 3000 is configured by the magnetic storage device or a non-volatile semiconductor memory.

The program memory 3000 stores a business application program. The business application program is, for example, a database or an accounting program, for creating and updating information to be stored in the storage system 100. Control programs and the control information stored in the program memory 3000 are described below referring to FIG. 8.

Figure 5:
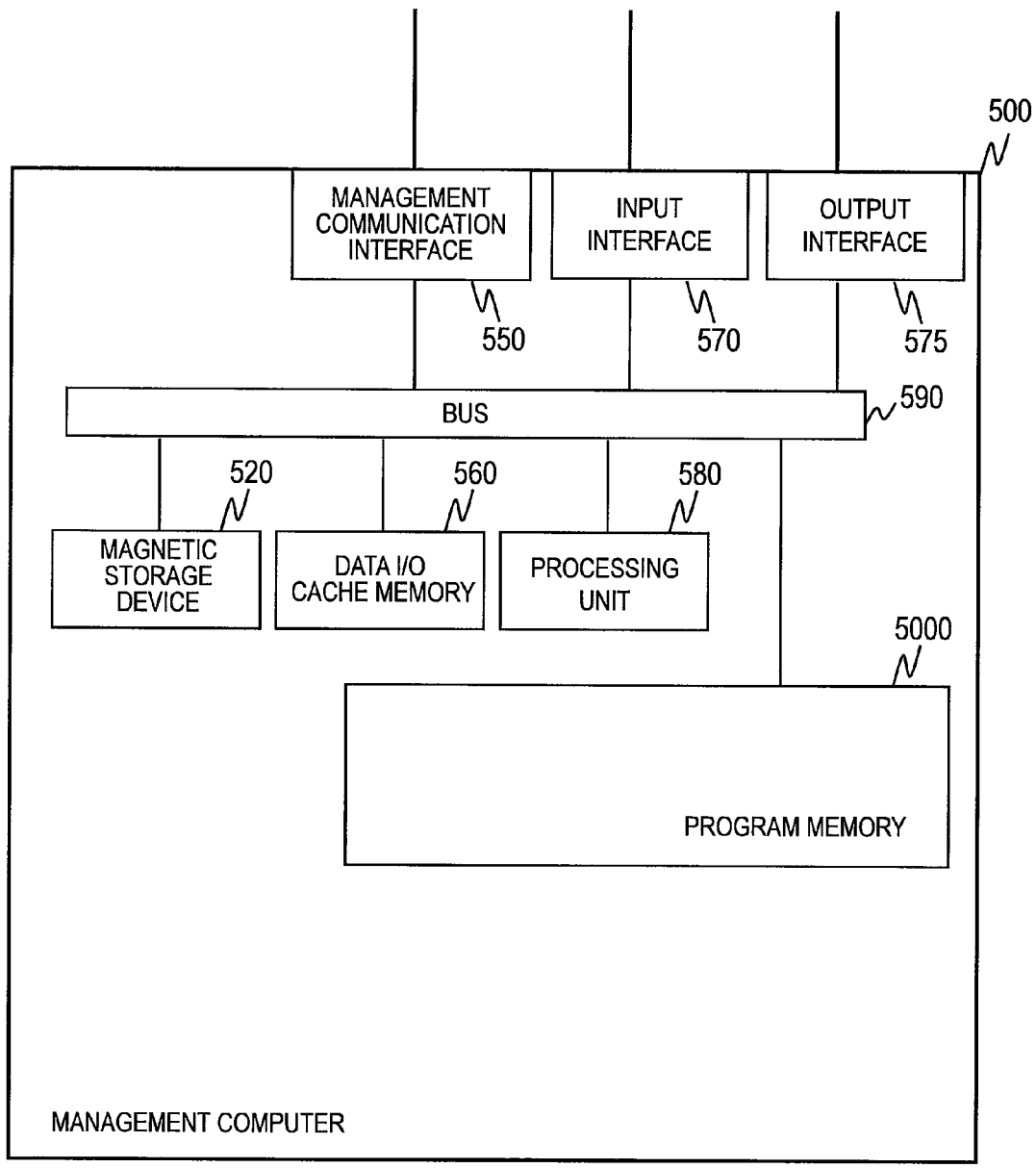
FIG. 5 is a block diagram showing a configuration of a management computer in accordance with the first embodiment of this invention.

FIG. 5 is a block diagram showing a configuration of the management computer 500 according to the first embodiment of this invention.

The management computer 500 includes a management communication interface 550, an input interface 570, an output interface 575, a processing unit 580, a magnetic storage device 520, a program memory 5000, and a data I/O cache memory 560.

The management communication interface 550, the input interface 570, the output interface 575, the processing unit 580, the magnetic storage device 520, the program memory 5000, and the data I/O cache memory 560 are coupled to each other through a communication bus 590. The management computer 500 has a hardware configuration realizable by a general-purpose computer (PC). The function of each component is the same as that of the host computer 300 illustrated in FIG. 4.

The program memory 5000 stores programs and information necessary for processing executed in the management computer 500. The program memory 5000 is configured by the magnetic storage device or the volatile semiconductor memory. The programs and the information stored in the program memory 5000 are described below referring to FIG. 9.

Figure 6:
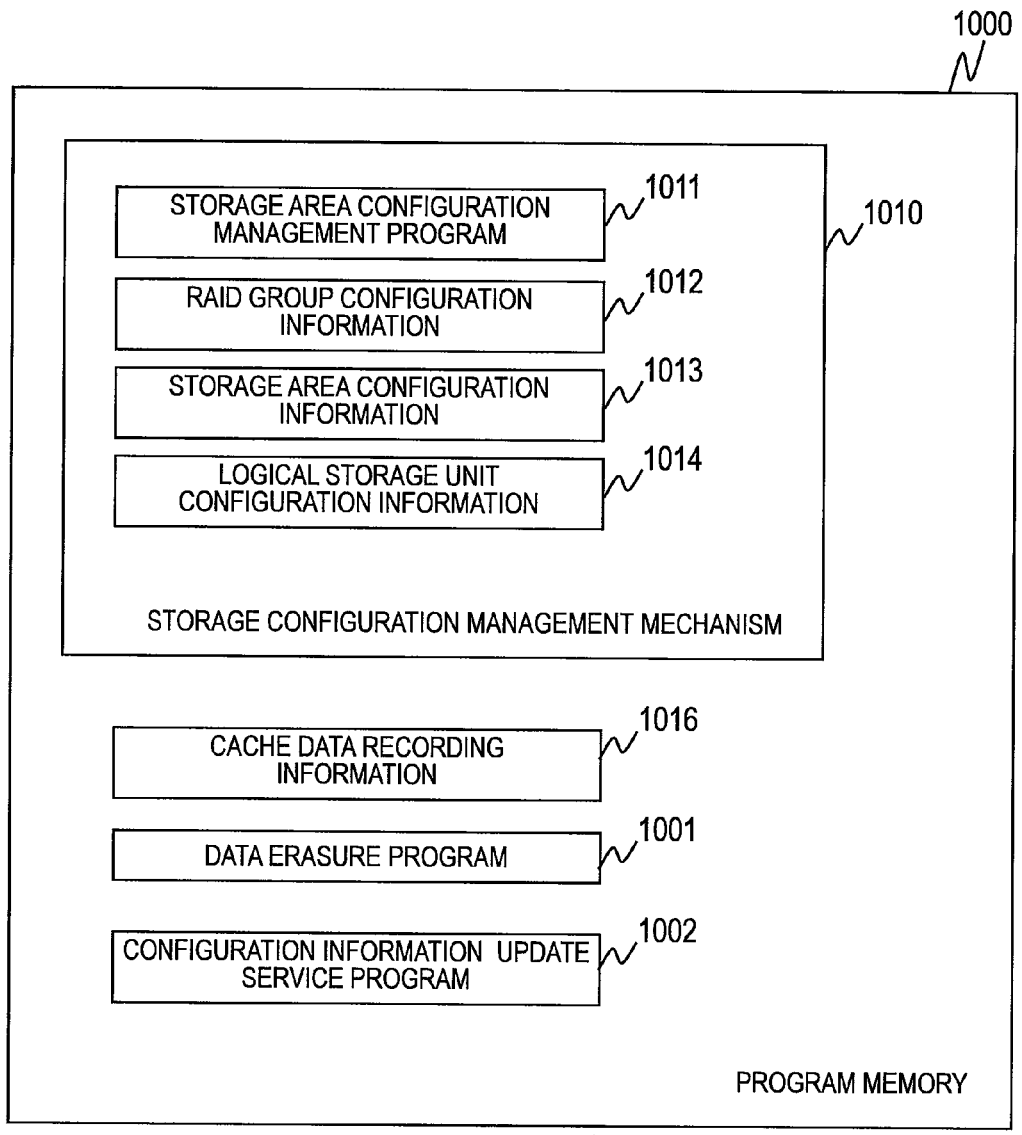
FIG. 6 is an explanatory diagram showing an example of control programs and control information stored in a program memory of the storage system in accordance with the first embodiment of this invention.

FIG. 6 is an explanatory diagram showing an example of configuration of the control programs and the control information stored in the program memory 1000 of the storage system 100 according to the first embodiment of this invention.

The program memory 1000 includes a storage configuration management mechanism 1010, cache data recording information 1016, a data erasure program 1001, and a configuration information update service program 1002.

The storage configuration management mechanism 1010 contains programs and information for managing a storage resource provided by the storage system 100 for the host computer 300. Specifically, the storage configuration management mechanism 1010 contains a storage area configuration management program 1011, RAID group configuration information 1012, storage area configuration information 1013, and logical storage unit configuration information 1014.

The storage area configuration management program 1011 is executed by the processor mounted in the storage controller 190 to manage and control the storage area provided for the host computer 300 based on the storage area configuration information 1013 described below.

The RAID group configuration information 1012 is configuration information of the RAID group formed by the assembly of the magnetic storage devices 120. The details of the RAID group configuration information 1012 will be described below referring to FIG. 10.

The storage area configuration information 1013 is configuration information of the storage area corresponding to a unit of the storage resource, which is obtained by dividing the RAID group into logical units. The details of the storage area configuration information 1013 will be described below referring to FIG. 11.

The logical storage unit configuration information 1014 is configuration information of a logical storage unit corresponding to a unit of the storage resource provided for the host computer 300. The details of the logical storage unit configuration information 1014 will be described below referring to FIG. 12.

The cache data recording information 1016 is management information of cache data stored in the data I/O cache memory 160. The details of the cache data recording information 1016 will be described below referring to FIG. 13.

The data erasure program 1001 is executed by the storage controller 190 to write dummy data such as zero data or random data over the storage area for a plurality of times. By writing the dummy data over the storage area for a plurality of times, remanent magnetism on the magnetic recording device 120 can be eliminated to perfectly prevent the data from being read. The number of times of overwriting of the dummy data is, for example, three.

The configuration information update service program 1002 is executed by the storage controller 190 to transmit the configuration information based on a request from the management computer 500.

Figure 7:
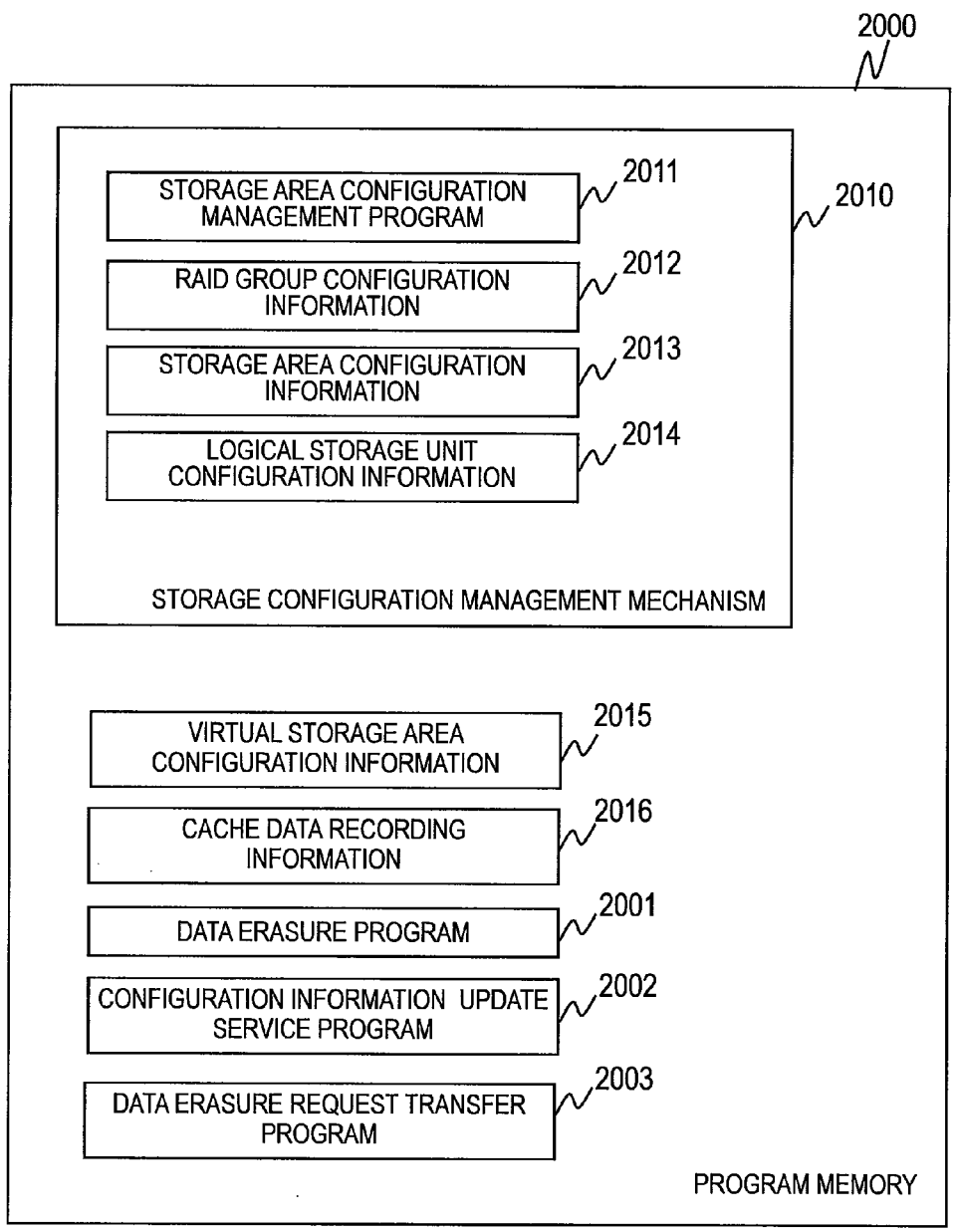
FIG. 7 is an explanatory diagram showing an example of control programs and control information stored in a program memory of the virtual storage system in accordance with the first embodiment of this invention.

FIG. 7 is an explanatory diagram showing an example of configuration of the control programs and the control information stored in the program memory 2000 of the virtual storage system 200 according to the first embodiment of this invention.

The program memory 2000 includes a storage configuration management mechanism 2010, virtual storage area configuration information 2015, cache data recording information 2016, a data erasure program 2001, a configuration information update service program 2002, and a data erasure request transfer program 2003.

The storage configuration management mechanism 2010 contains programs and information for managing a storage resource provided by the virtual storage system 200 for the host computer 300. The configuration of the storage configuration management mechanism 2010 is the same as that of the storage configuration management mechanism 1010 included in the storage system 100. Specifically, the storage configuration management mechanism 2010 contains a storage area configuration management program 2011, RAID group configuration information 2012, storage area configuration information 2013, and logical storage unit configuration information 2014. Each of the configurations thereof is the same as a corresponding one in the storage configuration management mechanism 1010 of the storage system 100. When the role of the virtual storage system 200 is limited to provide the virtual storage area, the storage configuration management mechanism 2010 may be omitted.

The virtual storage area configuration information 2015 contains the relation between the virtual storage area provided by the virtual storage system 200 and the storage area provided by the storage system 100, which constitutes the virtual storage area. The details of the virtual storage area configuration information 2015 will be described below referring to FIG. 14B.

The cache data recording information 2016 is management information of the cache data stored in the data I/O cache memory 260. The cache data recording information 2016 is the same as the cache data recording information 1016 included in the storage system 100.

As in the case of the data erasure program 1001 included in the storage system 100, the data erasure program 2001 writes the dummy data over the storage area for a plurality of times to eliminate the remanent magnetism on the magnetic storage device 220 to completely prevent the data from being read.

The configuration information update service program 2002 transmits the configuration information based on a request from the management computer 500, as in the case of the configuration information update service program 1002 provided in the storage system 100.

The data erasure request transfer program 2003 transfers an instruction of erasing data from the virtual storage area, which is received by the virtual storage system 200, to the storage system 100 which provides the storage area constituting the virtual storage area.

Figure 8:
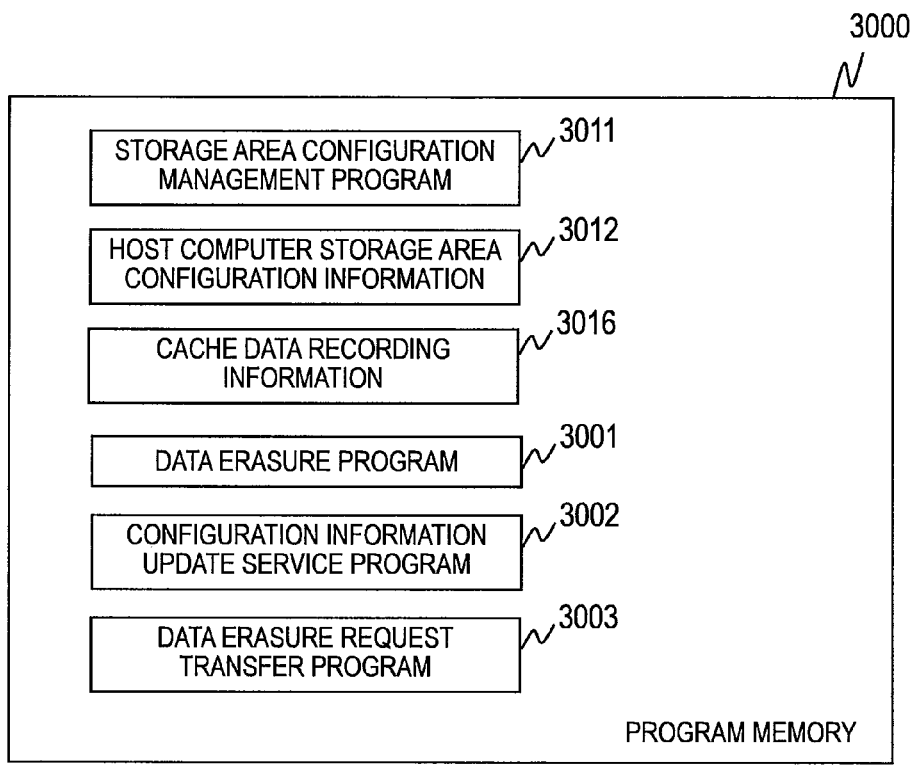
FIG. 8 is an explanatory diagram showing an example of control programs and control information stored in a program memory of the host computer in accordance with the first embodiment of this invention.

FIG. 8 is an explanatory diagram showing an example of configuration of the control programs and the control information stored in the program memory 3000 of the host computer 300 according to the first embodiment of this invention.

The program memory 3000 includes a storage area configuration management program 3011, host computer storage area configuration information 3012, cache data recording information 3016, a data erasure program 3001, a configuration information update service program 3002, and a data erasure request transfer program 3003.

The storage area configuration management program 3011 executes management and control for providing the storage area for the host computer 300 based on the host computer storage area configuration information 3012.

The host computer storage area configuration information 3012 contains the relation between a host computer storage area used for a file system running on the host computer 300 and the storage area provided by the storage system 100 or the virtual storage system 200, which constitutes the host computer storage area. The details of the host computer storage area configuration information 3012 will be described below referring to FIG. 15.

The cache data recording information 3016 is management information of the cache data stored in the data I/O cache memory 360 or the magnetic recording device 320. The details of the structure of the cache data recording information 3016 will be described below referring to FIG. 16. The cache data recording information 3016 may be represented by any of a memory cache and a disk cache in the first embodiment of this invention.

The data erasure program 3001 writes the dummy data over the storage area for a plurality of times to eliminate the remanent magnetism on the magnetic recording device 320 to completely prevent the data from being read, as in the case of the data erasure program 1001 provided in the storage device 100.

The configuration information update service program 3002 transmits the configuration information based on a request from the management computer 500, as in the case of the configuration information update service program 1002 provided in the storage system 100.

The data erasure request transfer program 3003 transfers an instruction of erasing data from the virtual storage area, which is received by the host computer 300, to the storage system 100 providing the storage area constituting the virtual storage area or the virtual storage system 200 providing the virtual storage area.

Figure 9:
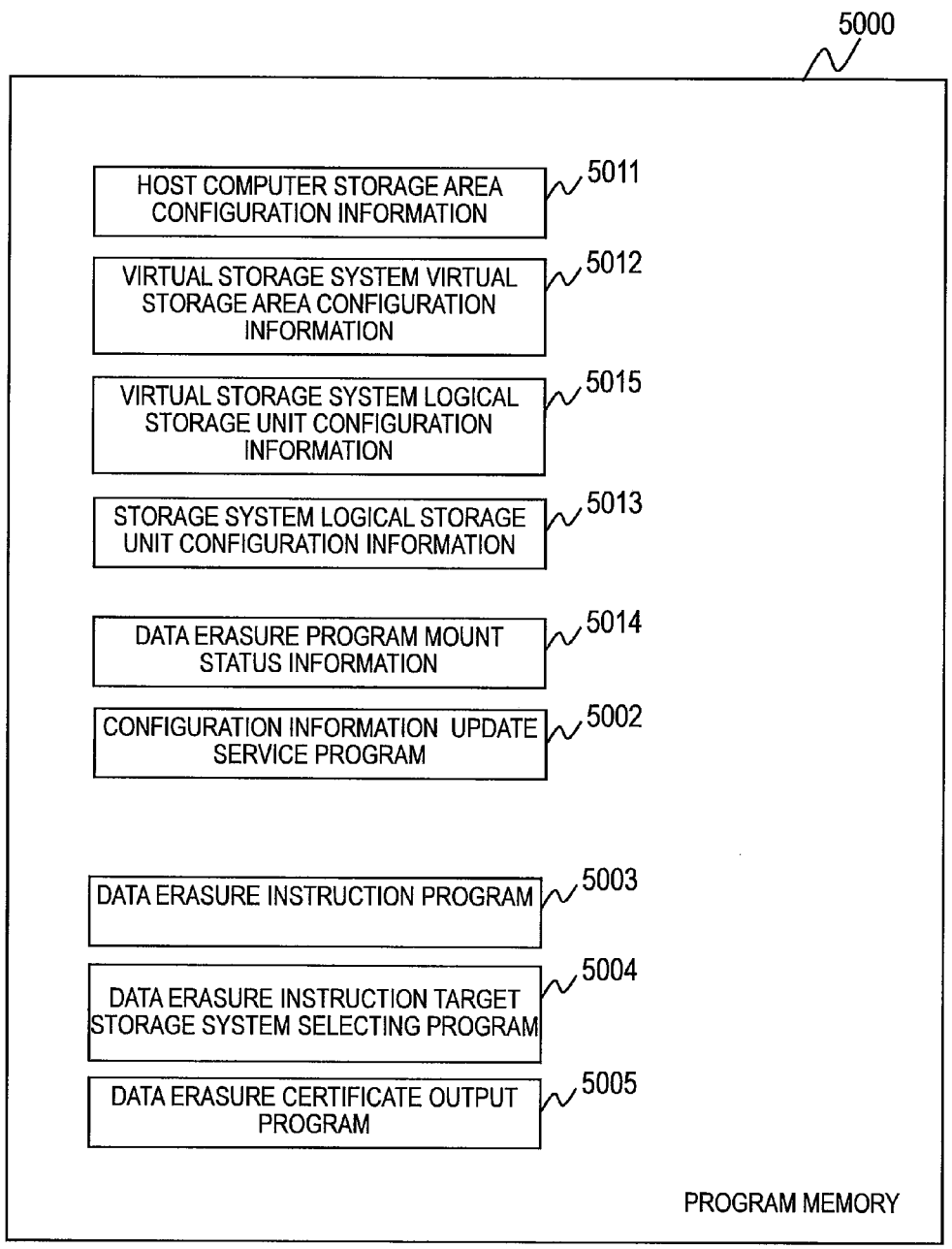
FIG. 9 is an explanatory diagram showing an example of control programs and control information stored in a program memory of the management computer in accordance with the first embodiment of this invention.

FIG. 9 is an explanatory diagram showing an example of configuration of the control programs and the control information stored in the program memory 5000 of the management computer 500 according to the first embodiment of this invention.

The program memory 5000 stores the configuration information of the devices to be managed (the storage system 100, the virtual storage system 200, and the host computer 300), data erasure program mount status information 5014, and various programs.

The configuration information includes host computer storage area configuration information 5011, virtual storage system virtual storage area configuration information 5012, and storage system logical storage unit configuration information 5013.

Various programs include a configuration information update service program 5002, a data erasure instruction program 5003, a data erasure instruction target system selecting program 5004, and a data erasure certificate output program 5005.

The host computer storage area configuration information 5011 is configuration information of the storage area referred to by the host computer 300. The host computer storage area configuration information 5011 is the same as the host computer storage area configuration information 3012 held in the host computer 300.

The virtual storage system virtual storage area configuration information 5012 is the configuration information of the virtual storage area provided by the virtual storage system 200. The virtual storage system virtual storage area configuration information 5012 is the same as the virtual storage area configuration information 2015 held in the virtual storage system 200.

The storage system logical storage unit configuration information 5013 is the configuration information of the logical storage unit provided by the storage system 100. The storage system logical storage unit configuration information 5013 is the same as the logical storage unit configuration information 1014 held in the storage system 100.

The data erasure program mount status information 5014 indicates whether or not the data erasure program is included in the storage system 100, the virtual storage system 200, and the host computer 300, which are targets to be managed.

The configuration information update service program 5002 is executed by the processing unit 580 to transmit/receive the configuration information between the storage system 100, the virtual storage system 200, and the host computer 300, which are targets to be managed. A procedure of processing by the configuration information update service program 5002 will be described below referring to FIG. 18.

The data erasure instruction program 5003 is executed by the processing unit 580 to transmit a data erasure instruction message to the storage system 100, the virtual storage system 200, or the host computer 300 based on information input by the administrator.

The data erasure instruction target system selecting program 5004 determines the system to which a data erasure instruction is to be actually transmitted, in response to the erasure instruction input by the administrator. A procedure of processing by the data erasure instruction target system selecting program 5004 will be described below referring to FIGS. 25 to 27 in a second embodiment of this invention.

The data erasure certificate output program 5005 provides an erasure certificate for the administrator through the output interface 575. An example of the erasure certificate will be described below referring to FIG. 23.

FIG. 10 is an explanatory diagram showing an example of the RAID group configuration information 1012 stored in the storage system 100 according to the first embodiment of this invention.

The RAID group configuration information 1012 stores the relation between the RAID group and the magnetic storage devices forming the RAID group. The RAID group configuration information 1012 includes RAID group identification information 10121 and magnetic storage device identification information 10122.

The RAID group identification information 10121 is an identifier for uniquely identifying the RAID group included in the storage system 100.

The magnetic storage device identification information 10122 is an identifier for uniquely identifying the magnetic storage devices 120 which form the RAID group identified by the RAID group identification information 10121. For example, the RAID group "RG-01" is formed by the magnetic storage devices "HD-01", "HD-02", "HD-03", and "HD-04".

FIG. 11 is an explanatory diagram showing an example of the storage area configuration information 1013 stored in the storage system 100 according to the first embodiment of this invention.

The storage area configuration information 1013 includes storage area identification information 10131, RAID group identification information 10132, a start block address 10133, and an end block address 10134.

The storage area identification information 10131 is an identifier for identifying the storage area. The RAID group identification information 10132 is an identifier for identifying the RAID group. The storage area identified by the storage area identification information 10131 is a logical storage area defined for the RAID group identified by the RAID group identification information 10132.

The start block address 10133 is a start block address of a physical area, at which the storage area identified by the storage area identification information 10131 is stored. On the other hand, the end block address 10134 is an end block address of the physical area, at which the storage area identified by the storage area identification information 10131 is stored.

FIG. 12 is an explanatory diagram showing an example of the logical storage unit configuration information 1014 stored in the storage system 100 according to the first embodiment of this invention.

The logical storage unit configuration information 1014 stores the relation between the communication interface, the storage unit corresponding to a unit of the storage resource accessible to the host computer 300, and the storage area.

The logical storage unit configuration information 1014 includes communication interface identification information 10141, storage unit identification information 10142, and storage area identification information 10143.

The communication interface identification information 10141 is an identifier for uniquely identifying the data I/O communication interface 140. The communication interface identification information 10141 stores, for example, a world wide name (WWN).

The storage unit identification information 10142 is an identifier for uniquely identifying the storage unit. The storage unit is a unit of the storage resource accessible to the host computer 300 coupled to the storage system 100 and corresponds to a volume mounted in the file system running on the host computer 300.

The storage area identification information 10143 is an identifier for uniquely identifying the logical storage area provided by the storage system 100.

FIG. 13 is an explanatory diagram view showing an example of the cache data recording information 1016 stored in the storage system 100 according to the first embodiment of this invention.

The cache data recording information 1016 stores the relation between address information of cached data and an address of the storage area at which the data is actually stored. The cache data recording information 1016 includes a cache memory address 10161, storage area identification information 10162, and a storage area address 10163.

The cache memory address 10161 indicates a physical address of the data stored in the cache memory. The storage area identification information 10162 is an identifier of the storage area which originally stores the cached data. The storage area address 10163 is an address of the storage area which originally stores the cached data.

FIG. 14A is an explanatory diagram showing an example of the logical storage unit configuration information 2014 stored in the virtual storage system 200 according to the first embodiment of this invention.

The structure of the logical storage unit configuration information 2014 stored in the virtual storage system 200 is the same as that of the logical storage unit configuration information 1014 stored in the storage system 100, as described above.

FIG. 14B is an explanatory diagram showing an example of the virtual storage area configuration information 2015 stored in the virtual storage system 200 according to the first embodiment of this invention.

The virtual storage area provided by the virtual storage system 200 corresponds to the storage area (logical storage unit) provided by the storage system 100. Data is actually read from/written to the corresponding storage area. The virtual storage area configuration information 2015 stores the relation between the virtual storage area and the storage area provided by the storage system 100, as described above.

The virtual storage area configuration information 2015 includes virtual storage area identification information 20151, communication interface identification information 20152, and storage unit identification information 20153.

The virtual storage area identification information 20151 is an identifier of the virtual storage area provided by the virtual storage system 200. The communication interface identification information 20152 is an identifier of the interface coupled to the logical storage unit provided by the storage system 100. The storage unit identification information 20153 is an identifier of the logical storage unit provided by the storage system 100.

Specifically, an I/O instruction to the virtual storage area (for example, "LD-01") recorded in the virtual storage area identification information 20151 is transferred to the data I/O communication interface "50:00:01:1E:0A:E8:10" indicated by the communication interface identification information 20152 via the data I/O network. Further, I/O processing is performed on the logical storage unit "LU-21" registered in the data I/O communication interface 140. In this manner, the I/O instruction from the host computer 300 is processed as if the I/O were performed on the virtual storage system 200. On the other hand, the I/O for the magnetic storage device 120 is actually processed for the storage system 100.

FIG. 15 is an explanatory diagram showing an example of the host computer storage area configuration information 3012 stored in the host computer 300 according to the first embodiment of this invention.

The host computer storage area is a storage area mounted in the file system running on the host computer 300. The host computer storage area corresponds to the storage area (logical storage unit) provided by the storage system 100 or the virtual storage area provided by the virtual storage system 200.

The host computer storage area configuration information 3012 includes host computer storage area identification information 30121, communication interface identification information 30122, and storage unit identification information 30123.

The host computer storage area identification information 30121 is an identifier for identifying the host computer storage area. The communication interface identification information 30122 is an identifier of the interface coupled to the storage area provided by the storage system 100 or the virtual storage area provided by the virtual storage system 200. The storage unit identification information 30123 is an identifier of the logical storage unit provided by the storage system 100 or the virtual storage system 200.

Specifically, the I/O for the storage volume (for example, "/mount/home") is executed for the logical storage unit identified by the communication interface identification information 30122 and the storage unit identification information 30123 via the data I/O network.

FIG. 16 is an explanatory diagram showing an example of the cache data recording information 3016 stored in the host computer 300 according to the first embodiment of this invention.

FIG. 16 illustrates the cache data recording information 3016 having a structure when the cache data is created as a file. When the cache data is stored in the data I/O cache memory 360, the cache data recording information 3016 has the same structure as that of the cache data recording information 1016 illustrated in FIG. 13.

The cache data recording information 3016 contains a file name 30161, a recording time 30162, and a cache file name 30163.

The file name 30161 is a name of a cached file. For the recording time 30162, a time at which the file identified by the file name 30161 is cached is recorded. The cache file name 30163 is a name of a file for storing the cache data of the file identified by the file name 30161.

Referring to the cache data recording information 3016 illustrated in FIG. 16, it is shown that cache data "/tmp/a.txt" of a file "/mount/home/user01/a.txt" is already present on the host computer 300.

FIG. 17 is an explanatory diagram showing an example of the data erasure program mount status information 5014 stored in the management computer 500 according to the first embodiment of this invention.

The data erasure program mount status information 5014 indicates whether or not the data erasure program is included in the system to be managed. The data erasure program mount status information 5014 contains management communication interface identification information 50141, data I/O communication interface identification information 50142, and erasure program mount status information 50143.

The management communication interface identification information 50141 is an identifier of the management communication interface 150, 250, or 350 included in the storage system 100, the virtual storage system 200, or the host computer 300. In the first embodiment of this invention, an IP address assigned to each management communication interface of each of the apparatuses is used as the identifier.

The data I/O communication interface identification information 50142 is an identifier of the data I/O communication interface 140 or 240 which is further provided when the system identified by the management communication interface is the storage system 100 or the virtual storage system 200.

The erasure program mount status information 50143 indicates whether or not the storage system identified by the management communication interface identification information 50141 has a function of erasing the data on the magnetic storage device (data erasure program). The erasure program mount status information 50143 has a value of 1 when the storage system has an erasure function and has a value of 0 when the storage system does not have the erasure function in the first embodiment of this invention, but a representation by a character string such as "Yes" and "No" may be used instead.

Figure 18:
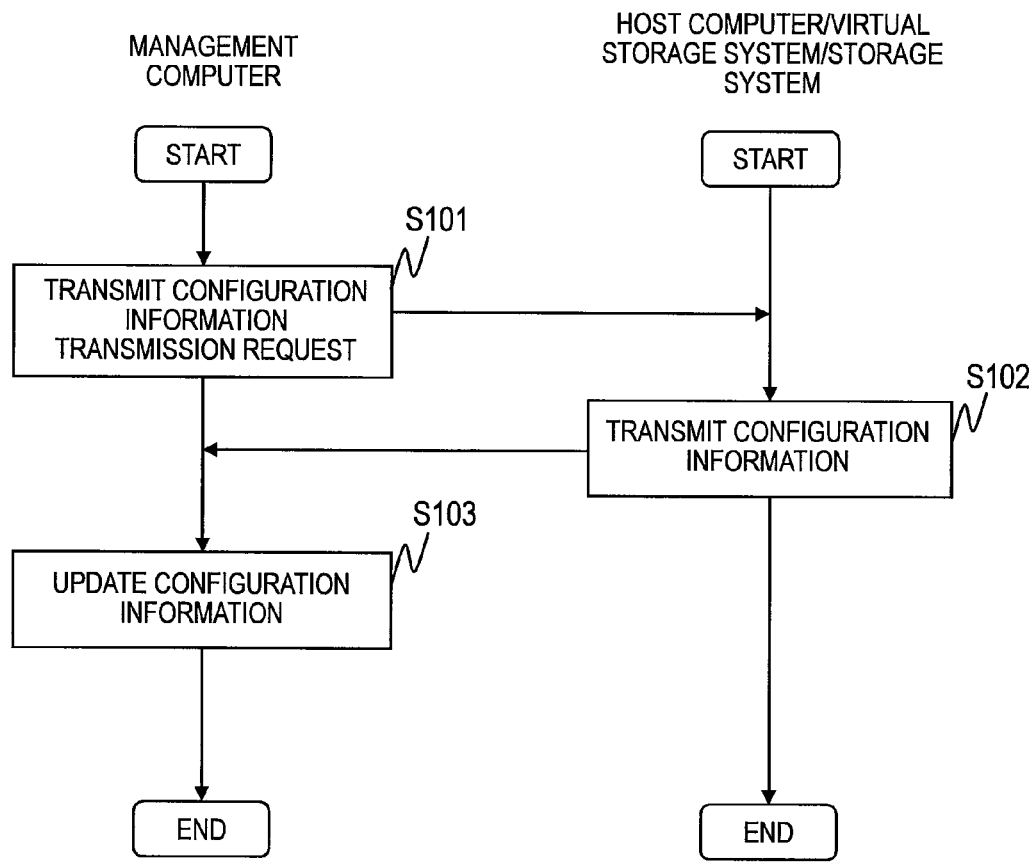
FIG. 18 is a flowchart showing a procedure of updating configuration information of the storage system, which is stored in the management computer in accordance with the first embodiment of this invention.

FIG. 18 is a flowchart showing a procedure of updating the configuration information of the storage system, which is stored in the management computer 500, according to the first embodiment of this invention.

This processing is performed by the execution of the configuration information update service program 5002 by the processing unit 580. As the schema of the processing, the configuration information is acquired from the storage system 100 to be stored in the program memory 5000 of the management computer 500.

The processing unit 580 of the management computer 500 first transmits a configuration information transmission request message to the storage system 100, the virtual storage system 200, and the host computer 300 (Step S101). In this step, the requested configuration information may be designated in the configuration information transmission request message to acquire only the necessary configuration information from the storage system 100.

When the storage system 100 receives the configuration information transmission request message, the storage controller 190 of the storage system 100 executes the configuration information update service program 1002 to transmit the configuration information of the storage system 100 to the management computer 500 based on the requested content (Step S102). Similarly, when the virtual storage system 200 receives the configuration information transmission request message, the storage controller 290 of the virtual storage system 200 executes the configuration information update service program 2002 to transmit the configuration information of the virtual storage system 200. Further, when the host computer 300 receives the configuration information transmission request message, the processing unit 380 of the host computer 300 executes the configuration information update service program 3002 to transmit the configuration information of the host computer 300.

Upon reception of the configuration information from each of the apparatuses, the processing unit 580 of the management computer 500 updates the configuration information held in the program memory 5000 (Step S103). In the first embodiment of this invention, the host computer storage area configuration information 5011, the virtual storage system virtual storage area configuration information 5012, and the storage system logical storage unit configuration information 5013 are constantly kept in their latest states.

Now, referring to FIGS. 19 to 22, a procedure of data erasure processing for the storage area according to the first embodiment of this invention will be described. The data erasure processing is started upon processing of the data erasure instruction program 5001 by the processing unit 580 of the management computer 500.

Figure 19:
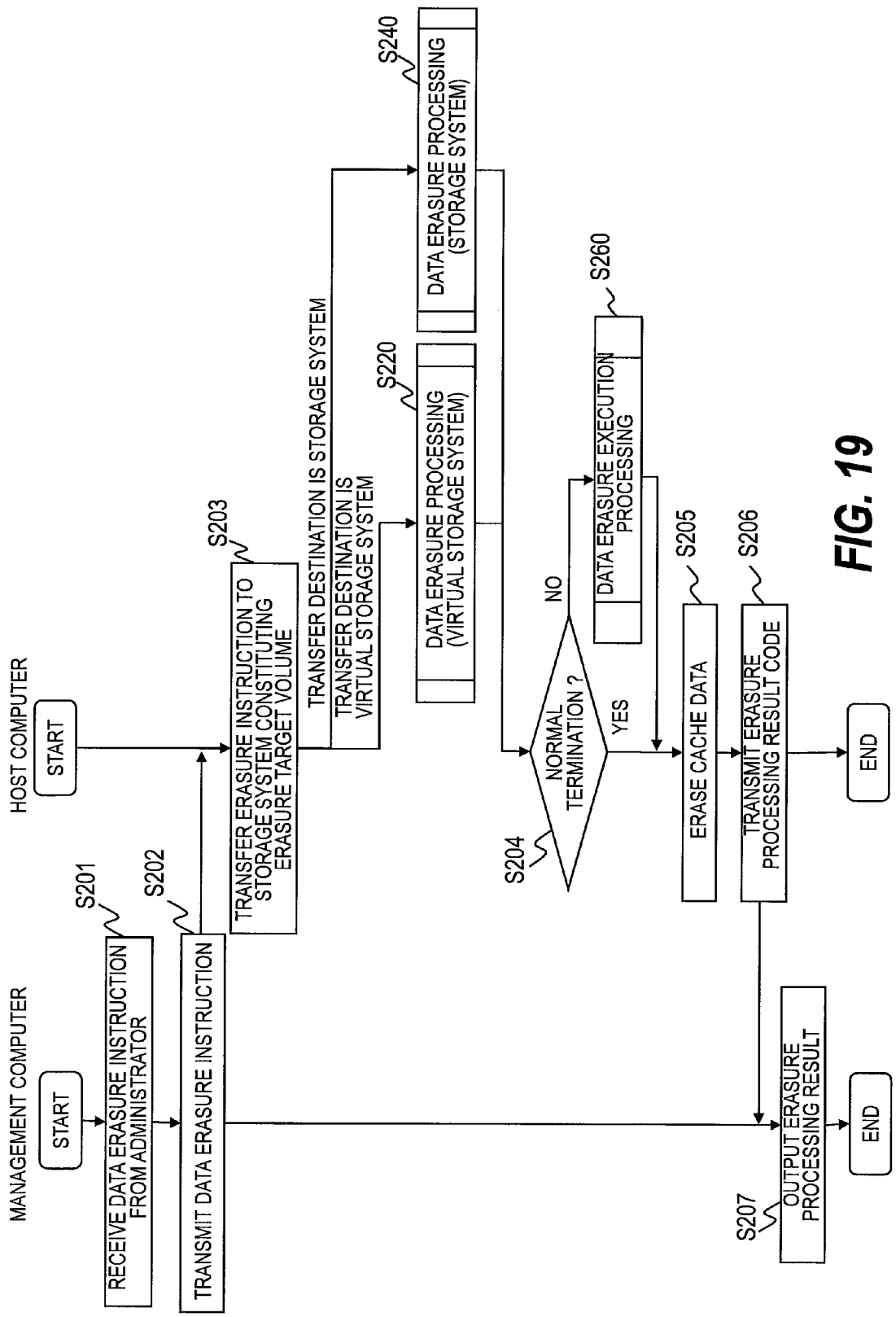
FIG. 19 is a flowchart showing a procedure of a data erasure processing for the storage area in accordance with the first embodiment of this invention.

FIG. 19 is a flowchart showing the procedure of the data erasure processing for the storage area according to the first embodiment of this invention. The flowchart illustrated in FIG. 19 shows the overall procedure of the data erasure processing.

The processing unit 580 of the management computer 500 executes the data erasure instruction program 5001 to receive a data erasure request instruction input by the system administrator (Step S201). The data erasure request instruction contains the storage area from which the data is to be erased and the system which provides the storage area. The system providing the storage area is the host computer 300, the virtual storage system 200, or the storage system 100.

Specifically, any of the host computer storage area operated by the host computer 300, the virtual storage area provided by the virtual storage system 200, and the storage area provided by the storage system 100 may be designated as the storage area from which the data is to be erased. In the first embodiment of this invention, the storage area of the host computer 300 is designated as a target from which the data is to be erased (hereinafter, referred to as an erasure target storage area or a data erasure target). A flowchart of the case where the virtual storage system 200 or the storage system 100 is designated as a data erasure target will be described in the second embodiment below.

The processing unit 580 of the management computer 500 transmits a data erasure instruction to the designated host computer 300 (Step S202). The data erasure instruction of this invention may be general-purpose means such as an erase command defined in the small computer system interface (SCSI) standard.

Upon reception of the data erasure instruction, the processing unit 380 of the host computer 300 refers to the host computer storage area configuration information 3012 to specify the data I/O communication interface and the logical storage unit for the erasure target storage area which is contained in the data erasure instruction. Then, the processing unit 380 transfers the data erasure instruction to the specified data I/O communication interface regardless of whether a transfer destination of the data erasure instruction is the virtual storage system 200 or the storage system 100 (Step S203).

When the data erasure instruction is to be transferred to the virtual storage system 200, the processing unit 380 of the host computer 300 transfers the data erasure instruction to the virtual storage system 200 to allow the virtual storage system 200 to execute the data erasure processing (Step S220). On the other hand, when the data erasure instruction is to be transferred to the storage system 100, the processing unit 380 of the host computer 300 transfers the data erasure instruction to the storage system 100 to allow the storage system 100 to execute the data erasure processing (Step S240). In this step, the communication interface identification information 30122 and the storage unit identification information 30123 which allow the identification of the logical storage unit are updated with the information of the erasure target storage area recorded in the data erasure instruction.

Figure 20:
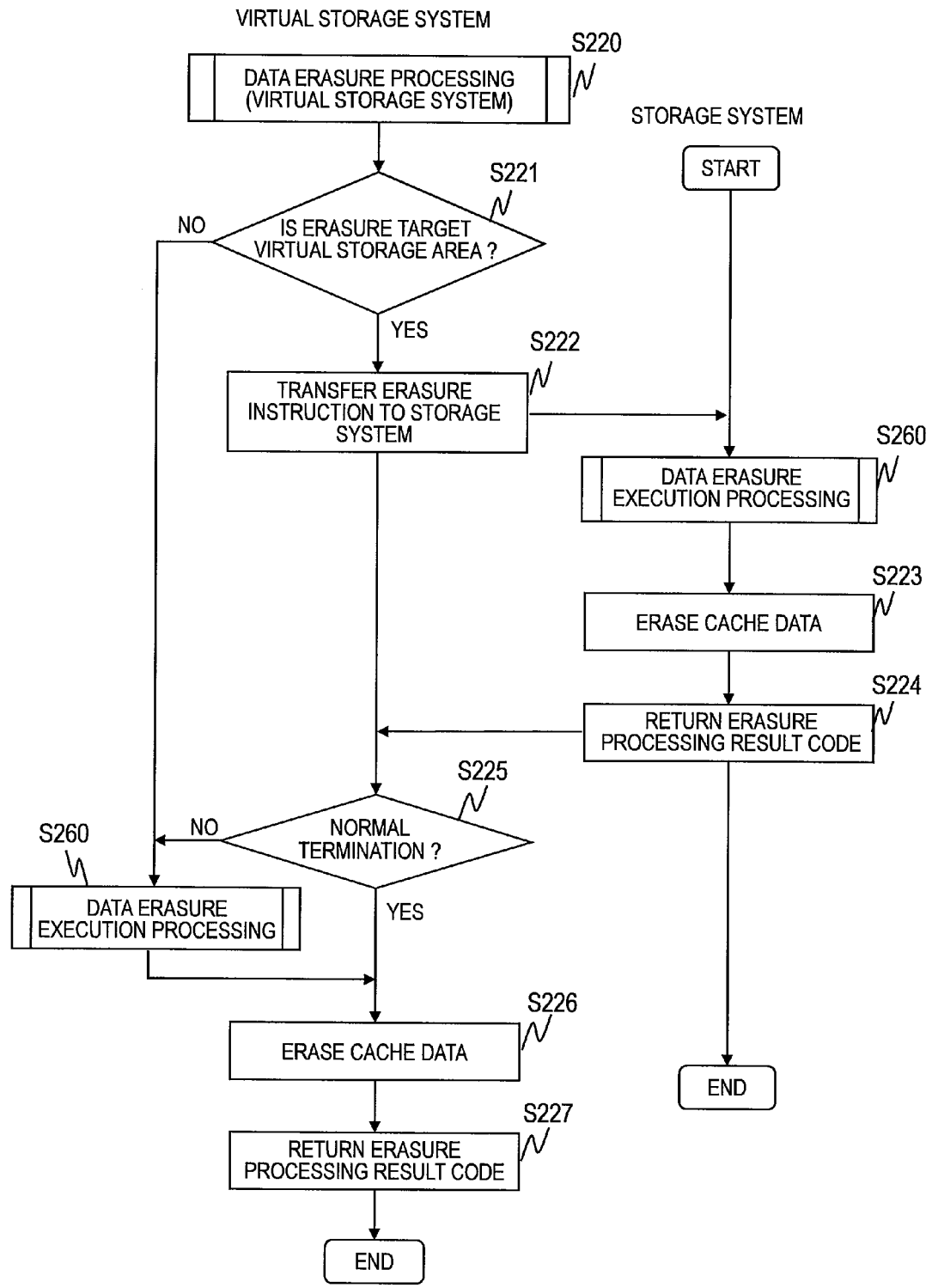
FIG. 20 is a flowchart showing a procedure of a data erasure processing for the storage area, in the case where data stored in the virtual storage system is to be erased, in accordance with the first embodiment of this invention.
Figure 21:
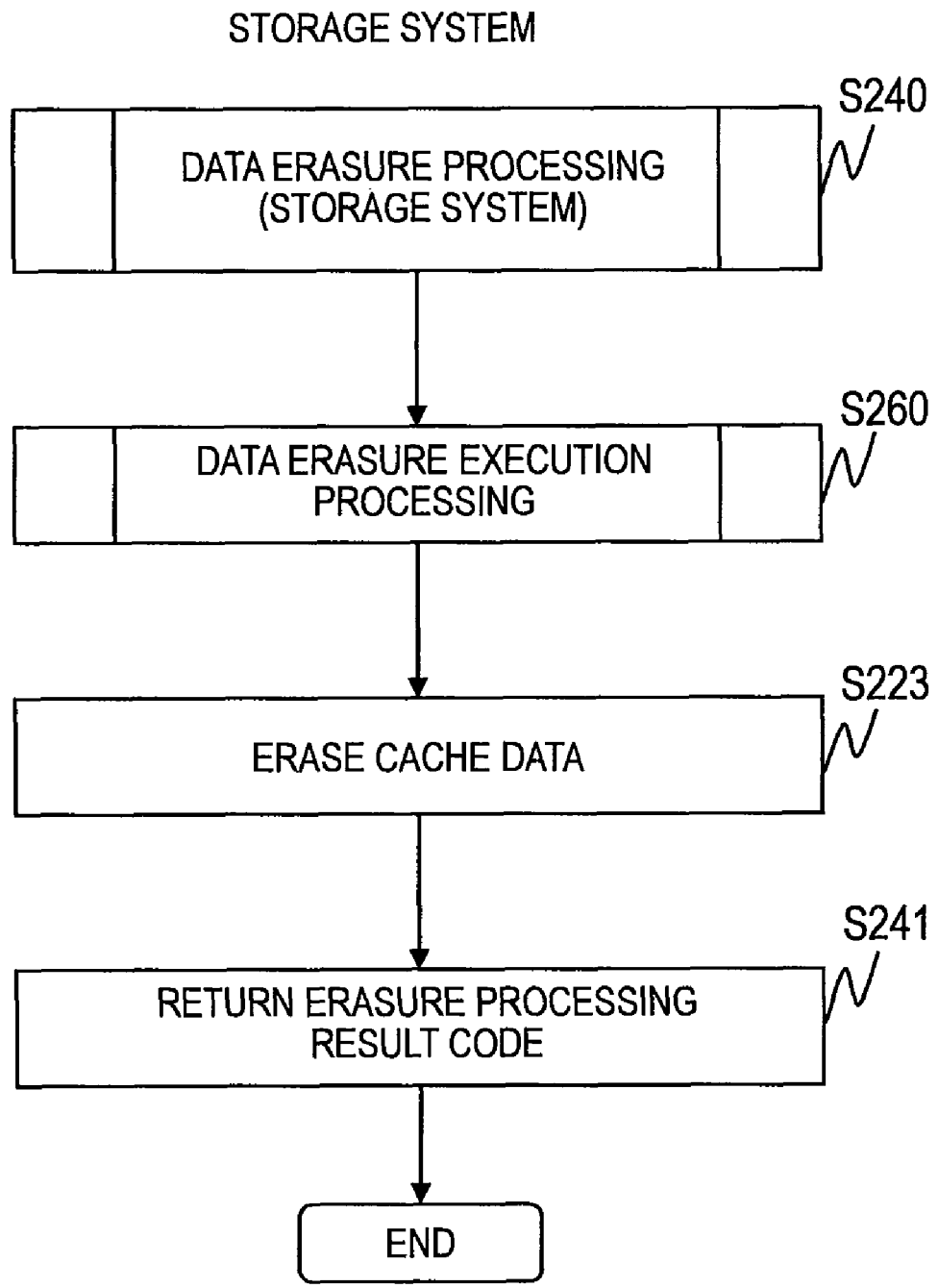
FIG. 21 is a flowchart showing the procedure of the data erasure processing for the storage area, in the case where data stored in the storage system is to be erased, in accordance with the first embodiment of this invention.

FIG. 20 illustrates the case where the transfer destination is the virtual storage system 200, whereas FIG. 21 illustrates the case where the transfer destination is the storage system 100. Each of the cases will now be described.

FIG. 20 is a flowchart showing the procedure of the data erasure processing for the storage area according to the first embodiment of this invention. The flowchart illustrated in FIG. 20 illustrates the procedure of erasing the data when the data erasure target is the virtual storage system 200.

Upon reception of the data erasure instruction, the storage controller 290 of the virtual storage system 200 executes the data erasure request transfer program 2003. The storage controller 290 of the virtual storage system 200 refers to the virtual storage area configuration information 2015 to determine whether or not the storage area designated as the data erasure target has been registered in the virtual storage area identification information 20151 (Step S221). By determining whether or not the erasure target storage area has been registered in the virtual storage area identification information 20151, it is possible to determine whether or not the erasure target storage area is the virtual storage area. Specifically, if the erasure target storage area has been registered in the virtual storage area identification information 2015, the storage area is the virtual storage area.

When the erasure target storage area is the virtual storage area (determined as "Yes" in Step S221), the storage controller 290 of the virtual storage system 200 transfers the data erasure instruction to the data I/O communication interface 140 recorded in the communication interface identification information 20152 which is registered in the virtual storage area configuration information 2015 (Step S222). In this step, the logical storage unit recorded in the storage unit identification information 20153 is updated with the information of the erasure target storage area recorded in the data erasure instruction.

Upon reception of the data erasure instruction, the storage controller 190 of the storage system 100 executes the data erasure processing for the erasure target storage area (Step S260). The procedure of the data erasure processing will be described below referring to FIG. 22.

After the completion of the erasure processing for the storage area, the storage controller 190 of the storage system 100 refers to the cache data recording information 1016 to erase all the cache data having the storage area identification information 10162 corresponding to the erasure target storage area (Step S223). After the completion of the above-described processing, an erasure processing result code is returned to the virtual storage system 200 corresponding to a request source (Step S224).

Upon reception of the erasure processing result code from the storage system 100, the storage controller 290 of the virtual storage system 200 refers to the received erasure processing result code to determine whether or not the result of the data erasure instruction is successful (normal termination) (Step S225). When the result of the data erasure processing in the storage system 100 is unsuccessful (abnormal termination) (determined as "No" in Step S225), the data erasure processing is executed for the erasure target virtual storage area.

Next, the storage controller 290 of the virtual storage system 200 refers to the cache data recording information 2016 to erase all the cache data having the storage area identification information 10162 corresponding to the erasure target storage area (Step S226). After the completion of the above-described processing, the storage controller 290 returns the erasure processing result code to the host computer 300 corresponding to a request source (Step S227).

FIG. 21 is a flowchart showing the procedure of the data erasure processing for the storage area according to the first embodiment of this invention. The flowchart illustrated in FIG. 21 illustrates the procedure of erasing the data in the case where the system from which the data is to be erased is the storage system 100.

Upon reception of the data erasure instruction, the storage controller 190 of the storage system 100 executes the data erasure processing for the storage area from which the data is to be erased (Step S260). The procedure of the data erasure processing will be described below referring to FIG. 22.

After the completion of the erasure processing for the storage area, the storage controller 190 of the storage system 100 refers to the cache data recording information 1016 to delete all the cache data having the storage area identification information 10162 corresponding to the erasure target storage area (Step S241). After the completion of the above-described processing, the storage controller 190 returns the erasure processing result code to the host computer 300 corresponding to a request source (Step S242).

Figure 22:
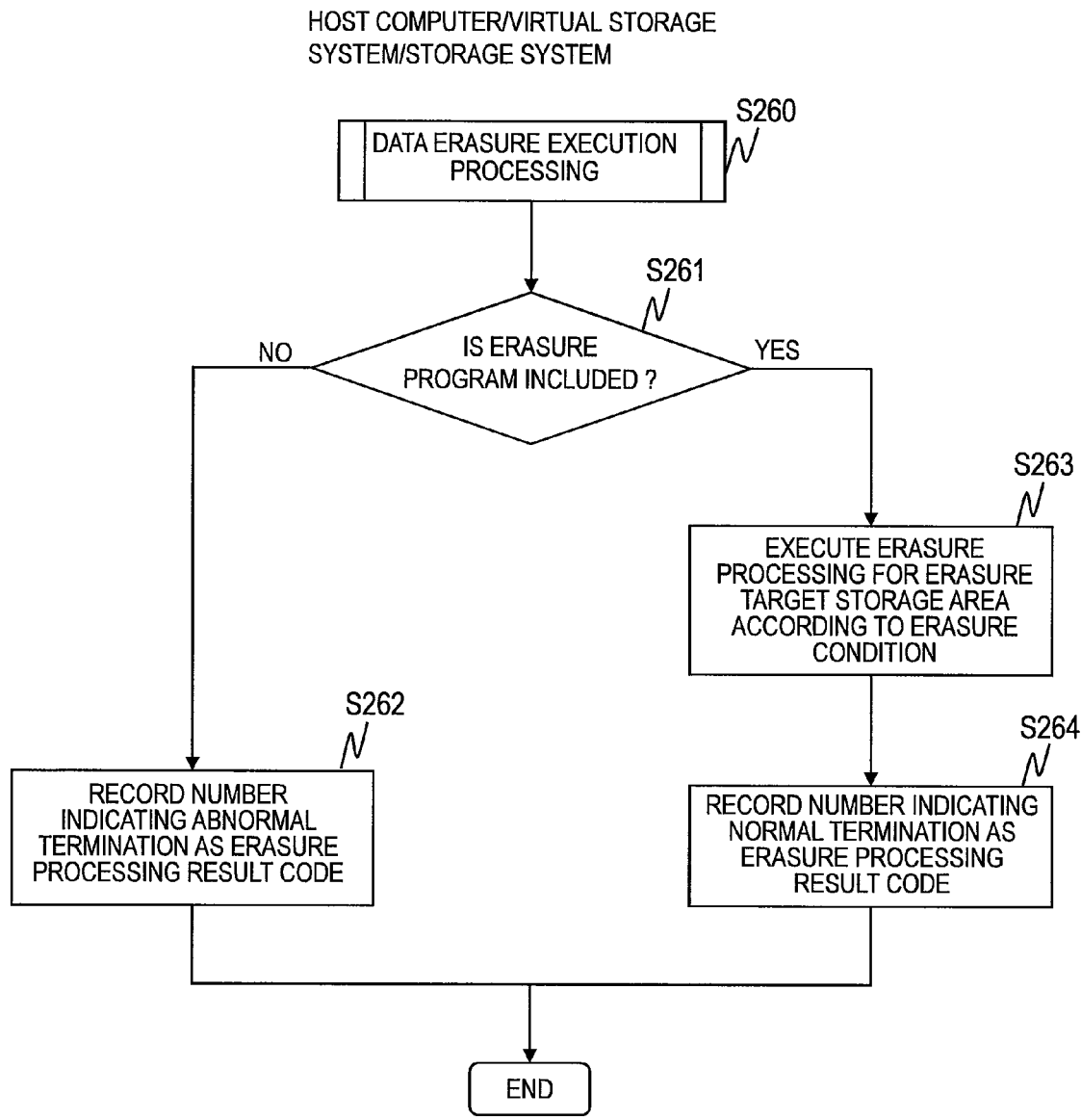
FIG. 22 is a flowchart showing a procedure of the data erasure processing for the storage area, which is executed in each system, in accordance with the first embodiment of this invention.

FIG. 22 is a flowchart showing the procedure of the data erasure processing for the storage area according to the first embodiment of this invention. The flowchart illustrated in FIG. 22 shows a procedure of the data erasure processing executed in each of the devices.

The procedure of this processing is common to the storage system 100, the virtual storage system 200, and the host computer 300. The data erasure program 1001 in the case of the storage system 100, the data erasure program 2001 in the case of the virtual storage system 200, and the data erasure program 3001 in the case of the host computer 300 are processed to execute this processing. Each of the processing described below is executed by the storage controller 190 in the case of the storage system 100, by the storage controller 290 in the case of the virtual storage system 200, and by the processing unit 380 in the case of the host computer 300.

The device, which has received the data erasure instruction, first determines whether or not the device has the erasure function satisfying an erasure condition (Step S261). When the device does not have the erasure function satisfying the erasure condition (determined as "No" in Step S261), a number indicating the abnormal termination is recorded as the erasure processing result code (Step S262).

On the other hand, when the device, which has received the data erasure instruction, has the erasure function satisfying the erasure condition (determined as "Yes" in Step S261), the device executes erasure processing for the erasure target storage area based on the designated erasure condition. For example, when the storage system 100 receives the data erasure instruction, the storage system 100 refers to the logical storage unit configuration information 1014 to specify the storage area constituting the designated logical storage unit. The storage system 100 further refers to the storage area configuration information 1013 to specify a RAID group and an address space constituting the storage area. Then, the storage system 100 writes zero data or random data indicated as the erasure condition over the specified address space to perform the erasure processing. When the device for executing the erasure processing is the virtual storage system 200, the virtual storage system 200 writes zero data or random data indicated as the erasure condition over the entire virtual storage area to perform the erasure processing.

After the completion of the erasure processing, the device, which has received the data erasure instruction, records a number indicating the normal termination as the erasure processing result code (Step S264).

The description now returns to the flowchart of FIG. 19.

Upon reception of the erasure processing result code, the processing unit 380 of the host computer 300 refers to the number recorded in the erasure processing result code to determine whether or not the data erasure instruction has been successfully completed (normal termination) (Step S204). In the case of the abnormal termination (determined as "No" in Step S204), the erasure processing is executed for the erasure target host computer storage area (Step S260).

When the result of the data erasure instruction is the normal termination (determined as "Yes" in Step S204) or the processing in Step S260 is completed, the processing unit 380 of the host computer 300 refers to the cache data recording information 3016 to delete all the cache data of the file stored in the erasure target host computer storage area based on the file name 30161 (Step S205). After the completion of the above-described processing, the processing unit 380 returns the erasure processing result code to the management computer 500 corresponding to a request source (Step S206).

Upon reception of the erasure processing result code from the host computer 300, the processing unit 580 of the management computer 500 executes the data erasure certificate output program 5005. Then, the processing unit 580 refers to the received erasure processing result code to output an erasure certificate indicating the result of processing through the output interface 575 (Step S207). An example of the output of the erasure certificate will be described below referring to FIG. 23.

By the above-described processing procedure, for the data erasure processing operation performed on the storage volume provided by the host computer 300, the data erasure instruction is transferred to the virtual storage system 200 or the storage system 100. As a result, instead of executing the data erasure processing on the host computer 300 which has received the data erasure instruction, the virtual storage system 200 or the storage system 100 executes the data erasure processing, thereby enabling the reduction of a processing load. Further, the remaining cache data is deleted to eliminate the security risk.

Figure 23:
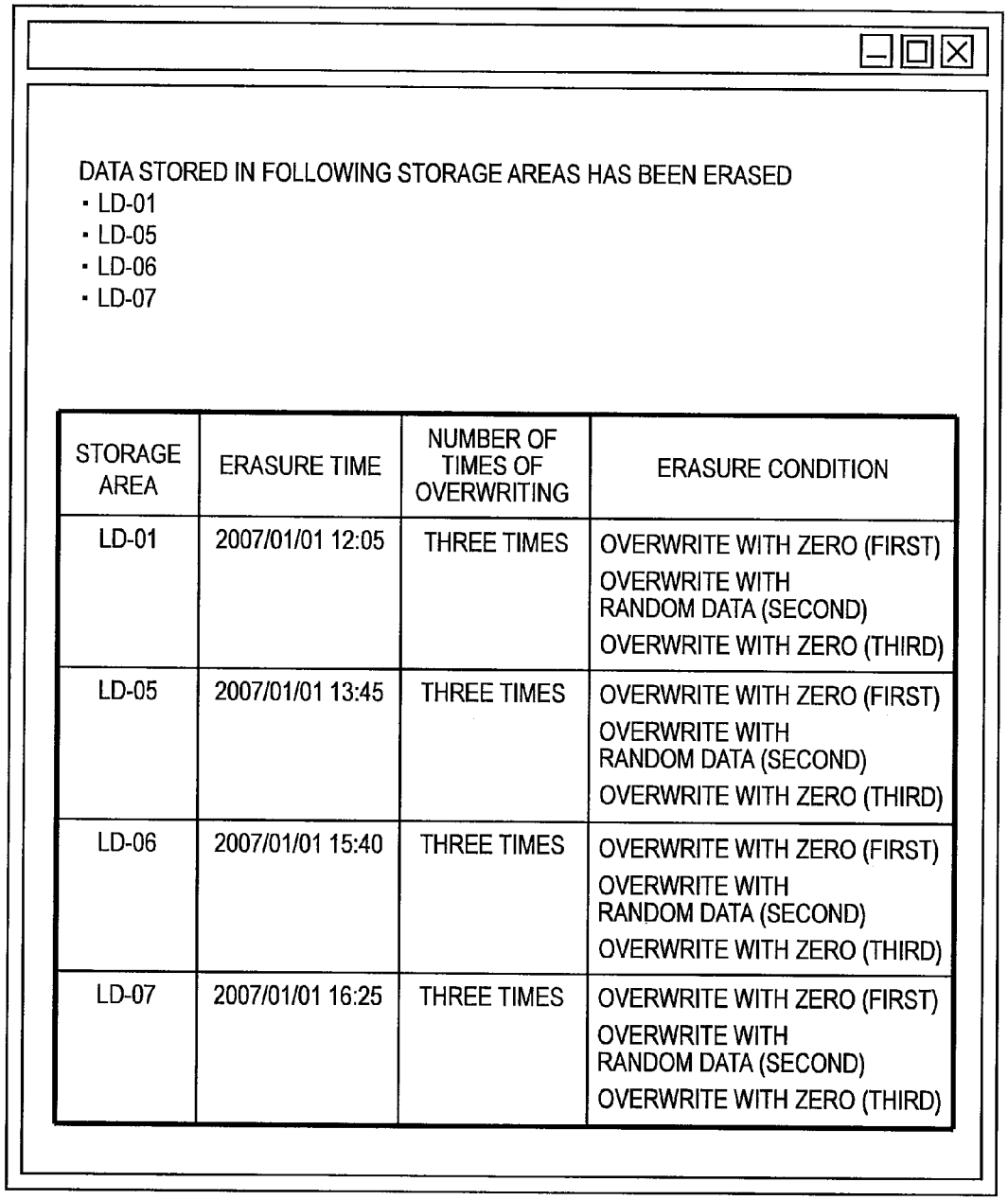
FIG. 23 is an explanatory diagram showing an exemplary of an output erasure certificate in accordance with the first embodiment of this invention.

FIG. 23 is an explanatory diagram showing an exemplary output of the erasure certificate according to the first embodiment of this invention.

As the erasure certificate, a list of the storage areas which have been subjected to the data erasure processing is output. If the storage area provided by the storage system 100 or the virtual storage system 200 is erased by transmitting the data erasure instruction to the host computer 300, the storage areas may be hierarchically displayed. Additionally, the erasure of the cache data may be explicitly indicated.

Based on the above-described procedure, the flow of the data erasure processing according to the first embodiment of this invention will be more specifically described.

Herein, the case where the erasure of data stored in the storage volume "/mount/home" operated in the host computer 300 is instructed by the administrator in the processing of Step S201 of FIG. 19 will be described. It is assumed that three-times overwrite, specifically, "overwrite with random, overwrite with 1, and overwrite with zero", is designated as the erasure processing condition.

The processing unit 380 of the host computer 300 refers to the host computer storage area configuration information 3012 in the processing of Step S203 to specify the storage area constituting the designated storage volume. Specifically, it is possible to specify that the storage area constituting the designated storage volume is the logical storage unit "LU-11" registered in the data I/O communication interface "50:00: 01:1E:0A:E8:02".

Subsequently, the processing unit 380 of the host computer 300 transfers the data erasure instruction to the specified data I/O communication interface. For the instruction transfer, the logical storage unit "LU-11" is designated as an erasure target in the data erasure instruction. In this case, the data erasure instruction is transferred to the virtual storage system 200.

Upon reception of the data erasure instruction, the storage controller 290 of the virtual storage system 200 refers to the logical storage unit configuration information 2014 to specify that the storage area constituting the erasure target logical storage unit is "LD-01". Further, the storage controller 290 refers to the virtual storage area configuration information 2015 to specify that the storage area is registered in the virtual storage area identification information 20151, thereby determining that the storage area is the virtual storage area (Step S221). Further, the storage controller 290 can specify that the storage area constituting the virtual storage area is the logical storage unit "LU-21" registered in the data I/O communication interface "50:00:01:1E:0A:E8:12". The storage controller 290 of the virtual storage system 200 transfers the data erasure instruction to the data I/O communication interface "50:00:01:1E:0A:E8:12". In this case, the logical storage unit "LU-21" is designated as the erasure target in the erasure instruction.

Upon reception of the data erasure instruction from the virtual storage system 200, the storage controller 190 of the storage system 100 executes the data erasure processing of the designated logical unit (Step S260). Then, the storage controller 190 of the storage system 100 refers to the logical storage unit configuration information 1014 in the processing of Step S263 of FIG. 22 to specify the storage area constituting the logical storage unit "LU-21". The storage controller 190 further refers to the storage area configuration information 1013 to specify the RAID group number and the address space constituting the storage area. Then, the storage controller 190 executes "overwrite with random data, overwrite with 1, and overwrite with 0" for the area indicated by the specified address based on the erasure processing condition.

The storage controller 190 of the storage system 100 deletes, in the processing of Step S233, the cache data having the storage area identification information 10162 which is identical with the storage area constituting the storage volume "LU-21".

Similarly, in the processing of Step S226, the storage controller 290 of the virtual storage system 200 refers to the cache data recording information 2016 to delete the cache data having the storage area identification information which is identical with "LD-01".

By the above-described processing, in response to the instruction of erasing the storage area in the host computer, the data on the magnetic storage device included in the storage system 100 can be erased without causing a large amount of traffic in the data I/O communication network.

According to the first embodiment of this invention, when the data stored in the storage area is to be erased, a large amount of overwrite data corresponding to the entire storage area can be prevented from being transferred via the network. As a result, a load on the network can be prevented from increasing. In particular, when data is written over the entire storage area for a plurality of times to completely erase the data, the first embodiment of this invention has a remarkably effect. More specifically, the amount of transferred data=the capacity of the storage area×the number of times of overwriting can be reduced to zero.

Moreover, according to the first embodiment of this invention, when the storage area is constituted by the virtual storage area, the load of processing of converting positional information of the virtual storage area into the physical storage area corresponding to the virtual storage area can be reduced in the virtual storage system.

Second Embodiment

In the first embodiment of this invention, the technology of transmitting the data erasure instruction to the host computer 300 to erase the data in the storage area provided by the host computer 300 has been described. In a second embodiment of this invention, the case where the data erasure instruction is directly transmitted to the storage system 100 or the virtual storage system 200 will be described.

In the second embodiment of this invention, the description of the contents common to the first embodiment of this invention will be omitted as needed.

Figure 24:
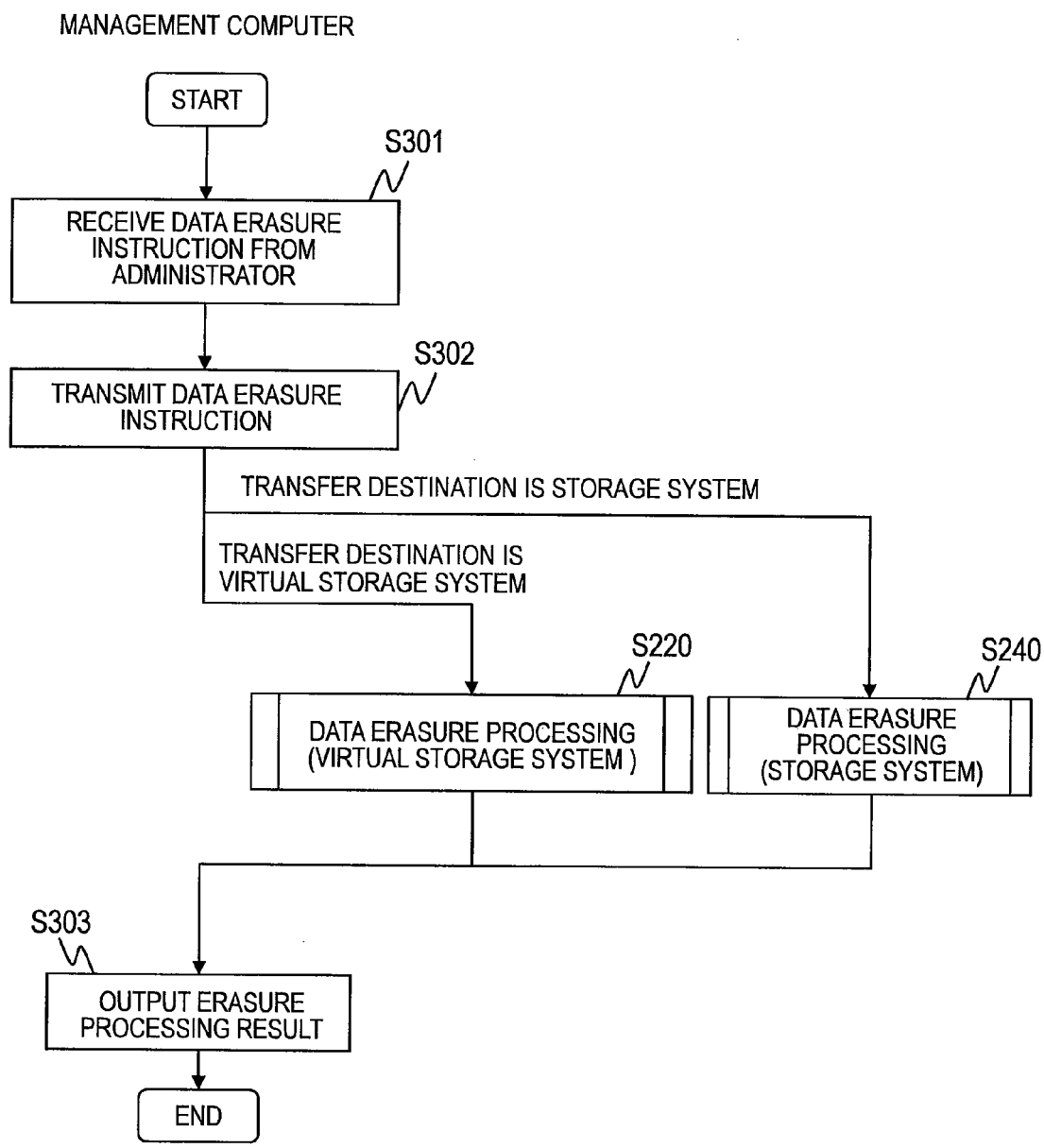
FIG. 24 is a flowchart showing a procedure of data erasure processing, in the case where a target of data erasure instruction input by the administrator through the input interface is the virtual storage area provided by the virtual storage system or the storage area provided by the storage area, in accordance with a second embodiment of this invention.

FIG. 24 is a flowchart showing a procedure of data erasure processing for the storage area according to the second embodiment of this invention. The flowchart of FIG. 24 shows a procedure of the processing when a target of the data erasure instruction input by the administrator through the input interface 570 is the virtual storage area provided by the virtual storage system 200 or the storage area provided by the storage area 100.

Upon reception of the data erasure instruction from the administrator (Step S301), the processing unit 580 of the management computer 500 specifies the communication interface to which the data erasure instruction is to be transferred. In order to specify the communication interface, the processing unit 580 refers to the virtual storage system virtual storage area configuration information 5012, the virtual storage system logical storage unit configuration information 5015, and the storage system logical unit configuration information 5013 collected from the storage system 100 and the virtual storage system 200.

After the specification of the communication interface to which the data erasure instruction is to be transferred, the processing unit 580 of the management computer 500 transmits the data erasure instruction to the specified communication interface (Step S302). Upon termination of the data erasure processing in the virtual storage system 200 (Step S220) or the data erasure processing in the storage system 100 (Step S240), the processing unit 580 outputs the result of the erasure processing (Step S303) to terminate this processing.

According to the second embodiment of this invention, as in the first embodiment of this invention, even when the data stored in the storage area provided by the storage system 100 or the virtual storage system 200 is to be erased, a large amount of overwrite data corresponding to the entire storage area can be prevented from being transferred via the network. As a result, the load on the network can be prevented from increasing.

Third Embodiment

In the first and second embodiments of this invention, the management computer 500, which has received the data erasure instruction from the administrator, transfers the data erasure instruction to each of the devices providing the storage area. In a third embodiment of this invention, however, after the erasure target storage area is specified on the management computer 500, the management computer 500 instructs each of the devices to erase the data. Further, a technology of further completely erasing the cache data of the data stored in the erasure target storage area will be described.

Now, referring to FIGS. 25 to 29, a procedure of the data erasure processing for the storage area according to the third embodiment of this invention will be described. The data erasure processing is executed by the processing of the data erasure instruction program 5001 by the processing unit 580 of the management computer 500.

Figure 25:
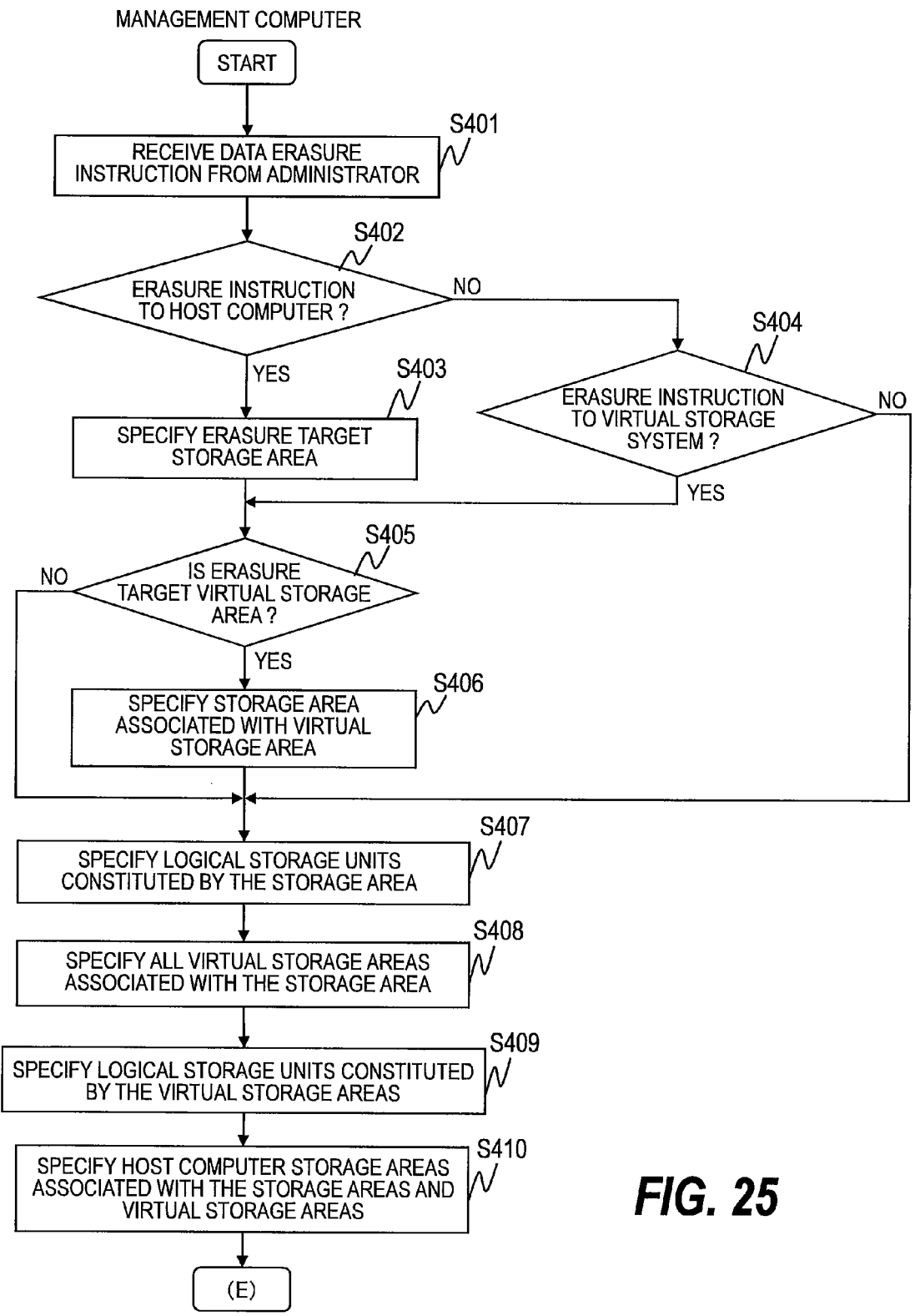
FIG. 25 is a flowchart showing a procedure of the data erasure processing for the storage area which specifies the data erasure target storage area in accordance with a third embodiment of this invention.

FIG. 25 is a flowchart showing a procedure of the data erasure processing for the storage area according to the third embodiment of this invention. The flowchart illustrated in FIG. 25 shows a procedure of processing of specifying the data erasure target storage area.

This processing is executed by processing the data erasure instruction target storage system selecting program 5004 and the data erasure instruction program 5003.

The processing unit 580 of the management computer 500 receives the data erasure instruction from the administrator through the input interface 570 (Step S401).

The processing unit 580 of the management computer 500 determines whether or not the input erasure target storage area is the host computer storage area operated by the host computer 300 (Step S402).

When the erasure target storage area is the host computer storage area (determined as "Yes" in Step S402), the processing unit 580 of the management computer 500 refers to the host computer storage area configuration information 5011. Then, the processing unit 580 specifies the data I/O communication interface 140 or 240 and the logical storage unit of the storage area constituting the erasure target host computer storage area (Step S403).

On the other hand, when the erasure target storage area is not the host computer storage area (determined as "No" in Step S402), the processing unit 580 of the management computer 500 determines whether or not the input erasure target storage area is the logical storage unit provided by the virtual storage system 200 (Step S404).

When the erasure target storage area is the logical storage unit provided by the virtual storage system 200 (determined as "Yes" in Step S404) or the processing of Step S403 is completed, the processing unit 580 of the management computer 500 refers to the virtual storage system logical storage unit configuration information 5015 to specify the storage area constituting the logical storage unit. The processing unit 580 further refers to the virtual storage system virtual storage area configuration information 5012 to determine whether or not the storage area is recorded in the virtual storage area identification information 20151 (Step S405).

When the specified storage area is registered in the virtual storage area identification information 20151 (determined as "Yes" in Step S405), the processing unit 580 of the management computer 500 specifies the data I/O communication interface 140 or 240 and the logical storage unit constituting the virtual storage area because the erasure target storage area is the virtual storage area (Step S406).

By the above-described processing, the logical storage unit, which actually stores the data and is provided by the storage system 100, can be specified when the input erasure target is the host computer storage area operated by the host computer 300 or the virtual storage area provided by the virtual storage system 200.

The processing unit 580 of the management computer 500 further refers to the storage system logical storage unit configuration information 5013 to specify all the logical storage units, each having the storage area identification information 10143 identical with the erasure target storage area (Step S407).

Next, the processing unit 580 of the management computer 500 refers to the virtual storage system virtual storage area configuration information 5012 to specify all the virtual storage areas, each having the combination of the data I/O communication interface identification information 20152 and the storage unit identification information 20153 which are identical with the logical storage units (Step S408).

The processing unit 580 of the management computer 500 also refers to the virtual storage system logical storage unit configuration information 5015 to specify all the logical storage units constituted by the virtual storage areas specified in the processing of Step S408 (Step S409).

Next, the processing unit 580 of the management computer 500 also refers to the host computer storage area configuration information 5011 to specify all the host computer storage areas, each having the combination of the data I/O communication interface identification information 30122 and the storage unit identification information 30123 which are identical with the logical storage units specified in the processing of Step S407 and Step S409 (Step S410).

By the above-described processing procedure, all the virtual storage areas and the host computer storage volumes constituted by the erasure target storage area can be specified.

Figure 26:
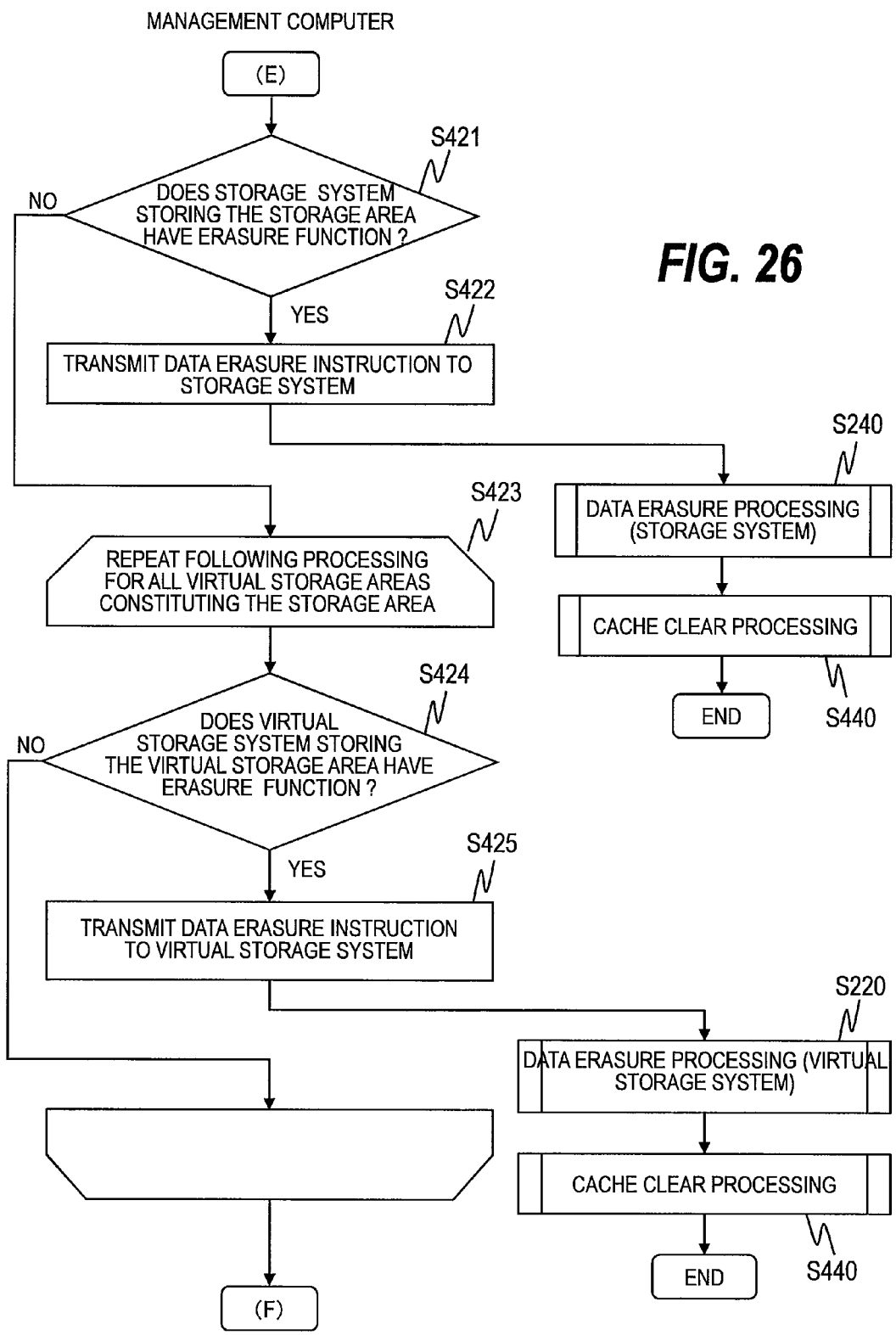
FIG. 26 is a flowchart showing a procedure of the data erasure processing for the storage area in accordance with the third embodiment of this invention.

FIG. 26 is a flowchart showing a procedure of the data erasure processing for the storage area according to the third embodiment of this invention. The flowchart illustrated in FIG. 26 shows a procedure of the case where the management computer 500 instructs the storage system 100 and the virtual storage system 200 to erase the data.

The processing unit 580 of the management computer 500 refers to the data erasure program mount status information 5014. Then, the processing unit 580 determines whether or not the storage system 100 providing the erasure target storage area specified in the processing of Step S406 of FIG. 25 has the erasure function (Step S421).

When the storage system 100 providing the erasure target storage area has the erasure function (determined as "Yes" in Step S421), the processing unit 580 of the management computer 500 determines the storage system 100 as a transmission destination of the data erasure instruction and then transmits the data erasure instruction to the storage system 100 (Step S422).

Upon reception of the data erasure instruction, the storage controller 190 of the storage system 100 executes the data erasure processing based on the instructed condition (Step S240). The data erasure processing in the storage system is as described above referring to FIG. 21.

The processing unit 580 of the management computer 500 further executes cache clear processing (Step S440). Upon completion of the cache clear processing, this processing is terminated. The cache clear processing will be described below referring to FIG. 28.

On the other hand, when the specified storage system 100 does not have the erasure function (determined as "No" in Step S421), the processing unit 580 of the management computer 500 repeats the following processing for all the virtual storage systems 200 providing the virtual storage areas which are specified by the processing of Step S408 of FIG. 25 and are constituted by the erasure target storage area (Step S423).

The processing unit 580 of the management computer 500 determines whether or not the specified virtual storage system 200 has the erasure function (Step S424).

When the specified virtual storage system 200 has the erasure function (determined as "Yes" in Step S424), the processing unit 580 of the management computer 500 determines the virtual storage system 200 as a target of transmission of the data erasure instruction and then transmits the data erasure instruction to the virtual storage system 200 (Step S425).

Upon reception of the data erasure instruction, the storage controller 290 of the virtual storage system 200 executes the data erasure processing based on the designated condition (Step S220). The data erasure processing in the virtual storage system is as described above referring to FIG. 20.

The processing unit 580 of the management computer 500 further executes the cache clear processing (Step S440). Upon completion of the cache clear processing, this processing is terminated. The cache clear processing will be described below referring to FIG. 28.

Figure 27:
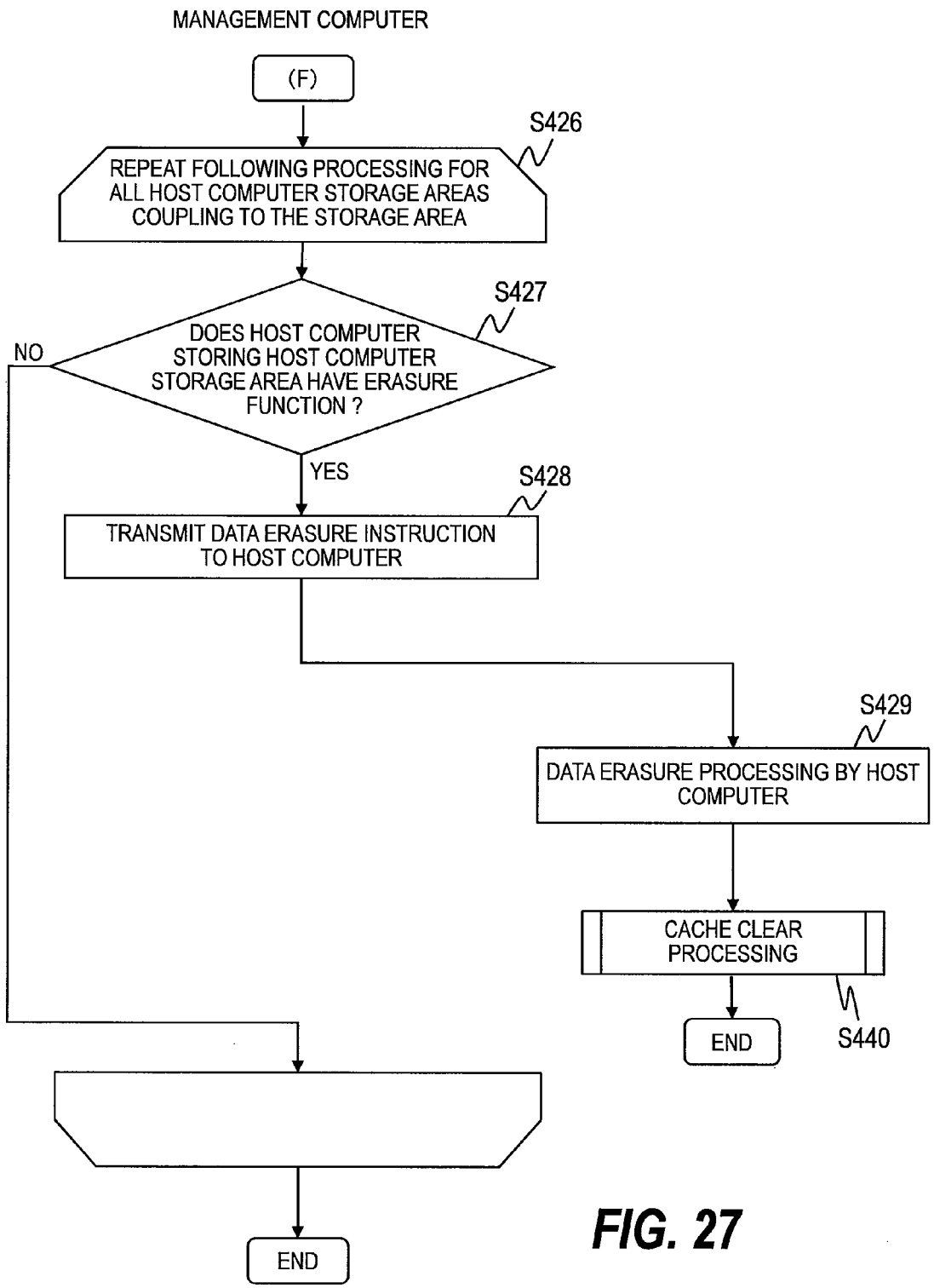
FIG. 27 is a flowchart showing a procedure of the data erasure processing for the storage area, which instructs to the host computer to erase data, in accordance with the third embodiment of this invention.

FIG. 27 is a flowchart showing a procedure of the data erasure processing for the storage area according to the third embodiment of this invention. The flowchart illustrated in FIG. 27 shows a procedure of the case where the management computer 500 instructs the host computer 300 to erase the data.

On the other hand, when none of the virtual storage systems 200 has the erasure function (determined as "No" in Step S424 of FIG. 26), the processing unit 580 of the management computer 500 repeats the following processing for the host computer 300 which operates the host computer storage area corresponding to the erasure target storage area specified by the processing of Step S410 of FIG. 25 (Step S426).

The processing unit 580 of the management computer 500 determines whether or not the host computer 300 which stores the host computer storage area has the erasure function (Step S427).

When the host computer 300 which stores the host computer storage area corresponding to the erasure target storage area has the erasure function (determined as "Yes" in Step S427), the processing unit 580 of the management computer 500 determines the host computer 300 as a target of transfer of the data erasure instruction and transmits the data erasure instruction to the host computer 300 (Step S428).

Upon reception of the data erasure instruction, the processing unit 380 of the host computer 300 executes the data erasure processing (Step S429). The data erasure processing in the host computer 300 is the same as that illustrated in FIG. 19.

Figure 28:
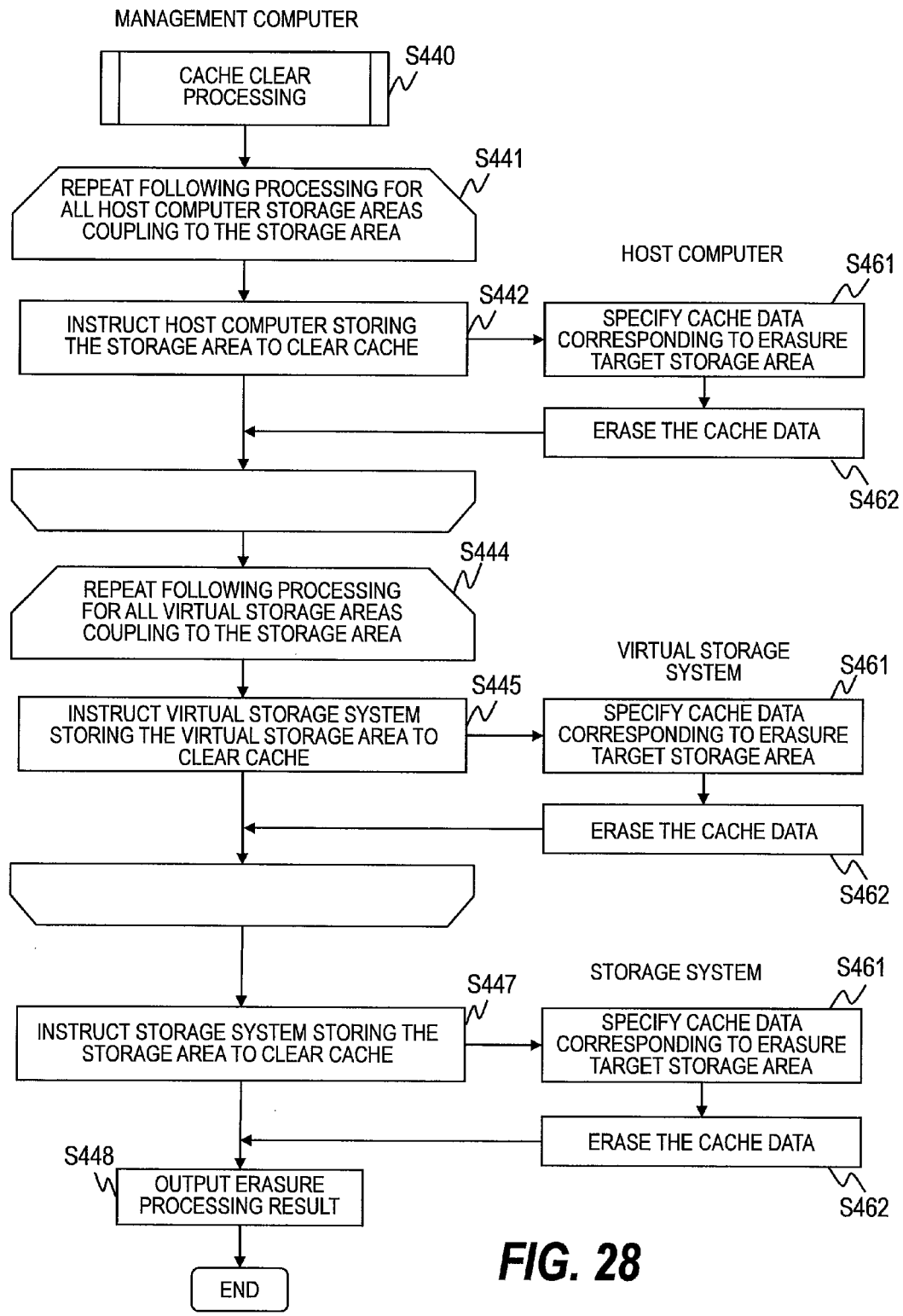
FIG. 28 is a flowchart showing a procedure of erasing the cache data in accordance with the third embodiment of this invention.

When the erasure of the data from the designated storage area is completed by the above-described processing, processing of causing the management computer 500 to instruct each of the devices to erase the cache data is performed to prevent the data stored in the erasure target storage area from remaining in the cache of each of the devices. A flowchart of this processing is illustrated in FIG. 28. Although the processing of erasing the cache data is included in the data erasure processing of each device, the execution of this processing ensures the erasure of the cache data even when the data erasure processing for each storage area does not include the cache data erasure processing.

FIG. 28 is a flowchart showing a procedure of erasing the cache data according to the third embodiment of this invention.

The processing unit 580 of the management computer 500 first instructs all the host computers 300 storing the host computer storage areas identical with the erasure target storage area, which are specified by the processing of Step S410 (Step S441), to erase the cache data of the data stored in the erasure target storage area (Step S442).

Upon reception of the instruction of erasing the cache data, the processing unit 380 of the host computer 300 refers to the cache data recording information 3016 to specify the cache data corresponding to the erasure target storage area (Step S461). Further, the processing unit 380 deletes the specified cache data (Step S462). Even for the cache data, the overwrite processing may be performed on the entire storage area for a plurality of times according to the data erasure condition stored in the storage area to completely erase the cache data.

Similarly, the processing unit 580 of the management computer 500 instructs the virtual storage system 200 constituting the erasure target storage area specified by the processing of Step S408 (Step S444) to erase the cache data of the data stored in the erasure target storage area (Step S445).

Upon reception of the instruction of erasing the cache data, the storage controller 290 of the virtual storage system 200 refers to the cache data recording information 2016 to specify the cache data corresponding to the erasure target storage area (Step S461). Further, the storage controller 290 deletes the specified cache data (Step S462).

Finally, the processing unit 580 of the management computer 500 instructs the storage system 100 which stores the erasure target storage area specified by the processing of Step S406 to request the cache data of the data stored in the erasure target storage area (Step S447).

Upon reception of the instruction of erasing the cache data, the storage controller 190 of the storage system 100 refers to the cache data recording information 1016 to specify the cache data corresponding to the erasure target recording area (Step S461). Further, the storage controller 190 deletes the specified cache data (Step S462).

Upon completion of the above-described cache data erasure processing, the processing unit 580 of the management computer 500 outputs the result of processing through the output interface 575 (Step S448).

According to the third embodiment of this invention, as in the first embodiment of this invention, a large amount of overwrite data corresponding to the entire storage area can be prevented from being transferred via the network when the data stored in the storage area is to be erased. As a result, the load on the network can be prevented from increasing.

Further, according to the third embodiment of this invention, the erasure of the cache data of the data stored in the erasure target storage area is ensured to further lower the security risk.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
a first storage system; and
a second storage system coupled to the first storage system,
wherein the first storage system comprises a first interface coupled to the second storage system, a first processor coupled to the first interface, and a first memory coupled to the first processor, the first storage system providing a first storage area from and to which data is read and written,
wherein the second storage system comprises a second interface coupled to the first storage system, a second processor coupled to the second interface, and a second memory coupled to the second processor, the second storage system providing a second storage area, and
wherein the second storage system is configured to:
read and write the requested data from and to the first storage area associated with the second storage area when the data is requested to be read from and to be written to the second storage area;
specify the first storage area associated with the second storage area from which the data is to be erased upon reception of a request for erasing the data stored in the second storage area; and
transmit the request for erasing the data to the first storage system providing the specified first storage area, and
wherein the first storage system is configured to erase the data stored in the specified first storage area, based on a data erasure condition included in the request for erasing the data, upon reception of the request for erasing the data.

2. The computer system according to claim 1, wherein the data erasure condition is erasure of the data stored in the first storage area by writing predetermined dummy data over the first storage area for a plurality of times.

3. The computer system according to claim 1, further comprising a host computer coupled to the first storage system and the second storage system via a network,
wherein the host computer comprises a third interface coupled to the network, a third processor coupled to the third interface, and a third memory coupled to the third processor, the host computer reading and writing data to a third storage area constituted by at least one of the first storage area and the second storage area,
wherein the host computer is, upon reception of the request for erasing the data stored in the third storage area, configured to:
specify the first storage system providing the first storage area when the third storage area from which the data is to be erased includes the first storage area,
specify the second storage system providing the second storage area when the third storage area from which the data is to be erased includes the second storage area, and
transmit the request for erasing the data to the specified first or second storage system.

4. The computer system according to claim 3, further comprising a management computer coupled to the first storage system, the second storage system, and the host computer via the network,
    wherein the management computer comprises a fourth interface coupled to the network, a fourth processor coupled to the fourth interface, and a fourth memory coupled to the fourth processor, and
    wherein the management computer is configured to:
    transmit the request for erasing the data to the first storage system providing the first storage area associated with the second storage area when the third storage area from which the data is requested to be erased includes the second storage area, upon reception of the request for erasing the data stored in the third storage area;
    transmit the request for erasing the data to the first storage system providing the first storage area when the third storage area from which the data is requested to be erased includes the first storage area, upon reception of the request for erasing the data stored in the third storage area; and
    transmit the request for erasing the data to the first storage system providing the first storage area associated with the second storage area from which the data is requested to be erased upon reception of the request for erasing the data stored in the second storage area.

5. The computer system according to claim 4, wherein the management computer transmits the request for erasing the data to the second storage system when the first storage system cannot execute data erasure processing satisfying the data erasure condition contained in the request for erasing the data.

6. The computer system according to claim 5, wherein the management computer transmits the request for erasing the data to the host computer when the second storage system cannot execute the data erasure processing satisfying the data erasure condition contained in the request for erasing the data.

7. The computer system according to claim 3,
    wherein the request for erasing the data includes an instruction of erasing cache data of the data to be erased, and
    wherein the host computer, the second storage system, and the first storage system erase the cache data of the data to be erased upon reception of the request for erasing the data containing the instruction of erasing the cache data.

8. The computer system according to claim 4, wherein the management computer outputs a certificate of the erasure of the data when erasure of the data stored in the first storage area is completed.

9. A management computer for managing a computer system comprising: a first storage system; a second storage system coupled to the first storage system; and a host computer coupled to the first storage system and the second storage system via a network, the management computer comprising:
    an interface coupled to the network;
    a processor coupled to the interface; and
    a memory coupled to the processor,
    wherein the first storage system provides a first storage area from and to which data is read and written,
    wherein the second storage system provides a second storage area and reads and writes the requested data from and to the first storage area associated with the second storage area when the data is requested to be read and written from and to the second storage area,
    wherein the host computer reads and writes the data from and to a third storage area constituted by at least one of the first storage area and the second storage area, and
    wherein the processor is configured to:
    transmit the request for erasing the data to the first storage system providing the first storage area associated with the second storage area, when the third storage area from which the data is requested to be erased includes the second storage area, upon reception of the request for erasing the data stored in the third storage area;
    transmit the request for erasing the data to the first storage system providing the first storage area when the third storage area from which the data is requested to be erased includes the first storage area, for erasing the data stored in the third storage area; and
    transmit the request for erasing the data to the first storage system providing the first storage area associated with the second storage area from which the data is requested to be erased upon reception of the request for erasing the data stored in the second storage area.

10. The management computer according to claim 9, wherein the processor transmits the request for erasing the data to the second storage system when the first storage system cannot execute data erasure processing satisfying a data erasure condition contained in the request for erasing the data.

11. The management computer according to claim 10, wherein the processor transmits the request for erasing the data to the host computer when the second storage system cannot execute the data erasure processing satisfying the data erasure condition contained in the request for erasing the data.

12. The management computer according to claim 9, wherein the processor outputs a certificate of the erasure of the data upon completion of erasure of the data stored in the first storage area.

13. A data management method for managing data stored in a first storage system in a computer system comprising the first storage system and a second storage system coupled to the first storage system,
    the first storage system comprising a first interface coupled to the second storage system, a first processor coupled to the first interface, and a first memory coupled to the first processor, the first storage system providing a first storage area from and to which data is read and written,
    the second storage system comprising a second interface coupled to the first storage system, a second processor coupled to the second interface, and a second memory coupled to the second processor, the second storage system providing a second storage area,
    the data management method comprising the steps of:
    reading and writing, by the second storage system, the requested data from and to the first storage area associated with the second storage area; when the data is requested to be read and written from and to the second storage area
    specifying, by the second storage system, the first storage area associated with the second storage area from which the data is to be erased upon reception of a request for erasing the data stored in the second storage area;
    transmitting, by the second storage system, the request for erasing the data to the first storage system providing the specified first storage area; and
    erasing, by the first storage system the data stored in the specified first storage area based on a data erasure condition contained in the request for erasing the data, upon reception of a request for erasing the data.

14. The data management method according to claim 13, wherein the data erasure condition is erasure of the data stored in the first storage area by writing predetermined dummy data over the first storage area for a plurality of times.

15. The data management method according to claim 13, wherein the computer system further comprises a host computer coupled to the first storage system and the second storage system via a network, the host computer comprising a third interface coupled to the network, a third processor coupled to the third interface, and a third memory coupled to the third processor, the host computer reading and writing data from and to a third storage area constituted by at least one of the first storage area and the second storage area, the data management method further comprising the steps of:

specifying, by host computer, the first storage system providing the first storage area when the third storage area from which the data is to be erased includes the first storage area, upon reception of the request for erasing the data stored in the third storage area;

specifying, by the host computer, the second storage system providing the second storage area when the third storage area from which the data is to be erased includes the second storage area, upon reception of the request for erasing the data stored in the third storage area; and transmitting, by the host computer, the request for erasing the data to the specified first or second storage system.

16. The data management method according to claim 15, wherein the computer system further comprises a management computer coupled to the first storage system, the second storage system, and the host computer via the network, wherein the management computer comprises a fourth interface coupled to the network, a fourth processor coupled to the fourth interface, and a fourth memory coupled to the fourth processor, wherein the data management method further comprises the steps of:

transmitting, by the management computer, the request for erasing the data to the first storage system providing the first storage area associated with the second storage area when the third storage area from which the data is requested to be erased includes the second storage area upon reception of the request for erasing the data stored in the third storage area;

transmitting, by the management computer, the request for erasing the data to the first storage system providing the first storage area when the third storage area from which the data is requested to be erased includes the first storage area, upon reception of the request for erasing the data stored in the third storage area; and transmitting, by the management computer, the request for erasing the data to the first storage system providing the first storage area associated with the second storage area from which the data is requested to be erased upon reception of the request for erasing the data stored in the second storage area.

17. The data management method according to claim 16, further comprising the step of:

transmitting, by the management computer, the request for erasing the data to the second storage system when the first storage system cannot execute data erasure processing satisfying data erasure condition contained in the request for erasing the data.

18. The data management method according to claim 17, further comprising the step of:

transmitting, by the management computer, the request for erasing the data to the host computer when the second storage system cannot execute the data erasure processing satisfying the data erasure condition contained in the request for erasing the data.

19. The data management method according to claim 15, wherein the request for erasing the data includes an instruction of erasing cache data of the data to be erased, and wherein the data management method further comprises the step of:

erasing, by the host computer, the second storage system, and the first storage system, the cache data of the data to be erased upon reception of the request for erasing the data containing the instruction of erasing the cache data.

20. The data management method according to claim 16, further comprising:

outputting, by the management computer, a certificate of the erasure of the data when erasure of the data stored in the first storage area is completed.

* * * * *